(12) United States Patent
Son et al.

(10) Patent No.: US 9,363,821 B2
(45) Date of Patent: Jun. 7, 2016

(54) APPARATUS AND METHOD FOR ALLOCATING RESOURCES IN COOPERATIVE COMMUNICATION SYSTEM

(71) Applicant: Samsung Electronics Co., Ltd., Gyeonggi-do (KR)

(72) Inventors: Yeong-Moon Son, Gyeonggi-do (KR); Jung-Shin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 14/279,212

(22) Filed: May 15, 2014

(65) Prior Publication Data

US 2014/0341130 A1 Nov. 20, 2014

(30) Foreign Application Priority Data

May 15, 2013 (KR) .................. 10-2013-0055040

(51) Int. Cl.
*H04W 72/10* (2009.01)
*H04W 72/08* (2009.01)
*H04B 7/02* (2006.01)

(52) U.S. Cl.
CPC ............ *H04W 72/10* (2013.01); *H04W 72/085* (2013.01); *H04B 7/024* (2013.01)

(58) Field of Classification Search
None
See application file for complete search history.

(56) References Cited

U.S. PATENT DOCUMENTS

| | | | |
|---|---|---|---|
| 7,792,533 B2 | 9/2010 | Grandblaise et al. | |
| 8,817,623 B2 | 8/2014 | Gupta et al. | |
| 2007/0249344 A1* | 10/2007 | Hosono | H04W 36/0083 455/435.1 |
| 2009/0161614 A1 | 6/2009 | Grandblaise et al. | |
| 2010/0111057 A1* | 5/2010 | Nakamura | H04W 36/0061 370/338 |
| 2010/0136994 A1* | 6/2010 | Kim | H04L 5/0035 455/450 |
| 2012/0230260 A1* | 9/2012 | Virtej | H04W 24/02 370/329 |
| 2012/0231805 A1* | 9/2012 | Wang | H04J 11/0073 455/452.1 |
| 2013/0083783 A1 | 4/2013 | Gupta et al. | |
| 2014/0141779 A1* | 5/2014 | Yuk | H04W 48/16 455/434 |

FOREIGN PATENT DOCUMENTS

| | | |
|---|---|---|
| EP | 2 101 519 A1 | 9/2009 |
| KR | 10-2014-0015904 | 2/2014 |
| WO | WO 2013009111 A2 | 1/2013 |

OTHER PUBLICATIONS

International Search Report dated Aug. 21, 2014 in connection with International Patent Application No. PCT/KR2014/004359; 3 pages.
Written Opinon of International Searching Authority dated Aug. 21, 2014 in connection with International Patent Application No. PCT/KR2014/004359; 6 pages.

* cited by examiner

*Primary Examiner* — Hassan Kizou
*Assistant Examiner* — Hashim Bhatti

(57) ABSTRACT

A method for allocating a resource in a serving base station (BS) in a cooperative communication system is provided. The method includes detecting a base station identifier (BSID) of the serving BS and a BSID of each of other serving BSs included in the cooperative communication system; determining an available resource which the serving BS will use and an available resource which each of other serving BSs will use based on the BSID of the serving BS and the BSID of each of the other serving BSs; and transmitting information on the determined available resources to cooperative communication cell member BSs which the serving BS manages.

38 Claims, 24 Drawing Sheets

APPARATUS AND METHOD FOR ALLOCATING RESOURCES IN COOPERATIVE COMMUNICATION SYSTEM

CROSS-REFERENCE TO RELATED APPLICATION AND CLAIM OF PRIORITY

The present application is related to and claims the benefit under 35 U.S.C. §119(a) of a Korean patent application No. 10-2013-0055040 filed in the Korean Intellectual Property Office on May. 15, 2013, the entire disclosure of which is incorporated herein by reference.

TECHNICAL FIELD

The present disclosure relates to an apparatus and method for allocating a resource in a cooperative communication system.

BACKGROUND

A mobile communication system has evolved to provide various high-speed large-capacity services to mobile stations (MSs). Examples of the mobile communication system include a high speed downlink packet access (HSDPA) mobile communication system, a high speed uplink packet access (HSUPA) mobile communication system, a long-term evolution (LTE) mobile communication system, a LTE-advanced (LTE-A) mobile communication system, a high rate packet data (HRPD) mobile communication system proposed in a 3rd generation project partnership 2 (3GPP2), and an institute of electrical and electronics engineers (IEEE) 802.16m mobile communication system.

Generally, in a mobile communication system, a handover procedure is performed if an MS moves. If the handover procedure is performed, a context for the MS is forwarded from a serving base station (BS) to a target BS, the target BS provides continuously a service to the MS based on the context for the MS which has been forwarded from the serving BS. The context is classified into a static context and a dynamic context, each of the static context and the dynamic context will be described.

Firstly, the static context includes total configuration information related to the MS, capability information, service flow & quality of service (QoS) information, etc. and does not change although the handover procedure is performed.

Secondly, the dynamic context indicates information which is exchanged between BSs for status information synchronization for the MS, and includes counter information, timer information, state machines status information, data buffer contents, etc.

If data which the MS should receive is buffering on a buffer of a serving BS, the data which the serving BS is buffering is forwarded to a target BS while the MS performs a handover procedure.

For convenience, 'data which an MS should receive' will be called as 'MS receiving schedule data'. Thereafter, if the MS finally accesses the target BS according to completion of the handover procedure, the target BS starts to transmit the forwarded MS receiving schedule data to the MS.

In an LTE mobile communication system as a typical mobile communication system, if a handover procedure of an MS starts to perform, a serving BS forwards MS receiving data which is forwarded through a packet data network (PDN) gateway to a target BS through a link which is established with the target BS. In this data forwarding method, while a network signaling is ongoing, the MS may resume receiving data although the MS accesses the target BS on a state on which a path between the target BS and the PDN gateway is not yet established.

Recently, a cooperative communication system in which a plurality of BSs provide a service to an MS by cooperating with one another, that is, the plurality of BSs provide the service to the MS using a multiple BS cooperation scheme has been proposed, and a study for the cooperative communication system has progressed.

The same handover procedure may occur in the cooperative communication system, so it is important for a total system performance of the cooperative communication system that the cooperative communication system continuously provides a service to the MS.

However, the cooperative communication system has been recently proposed and a study for the cooperative communication system has been actively progressed, so a data scheduling process according to performing a handover procedure has not been concretely proposed.

So, there is a need for data scheduling scheme which is appropriate to a situation of the cooperative communication system, i.e., a communication situation on which a multiple BS cooperation scheme is used and in which normal data transmission/reception is possible.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an apparatus and method for allocating a resource in a cooperative communication system.

Another aspect of the present disclosure is to provide an apparatus and method for scheduling data in a cooperative communication system.

Another aspect of the present disclosure is to provide an apparatus and method for scheduling data according to a change of a serving BS for an MS in a cooperative communication system.

Another aspect of the present disclosure is to provide an apparatus and method for scheduling data using an inter-BS scheduling scheme according to a change of a serving BS for an MS in a cooperative communication system.

In accordance with an aspect of the present disclosure, a serving base station (BS) in a cooperative communication system is provided. The serving BS includes a controller configured to detect a base station identifier (BSID) of the serving BS and a BSID of each of other serving BSs included in the cooperative communication system, and determine an available resource which the serving BS will use and an available resource which each of other serving BSs will use based on the BSID of the serving BS and the BSID of each of the other serving BSs; and a transmitter configured to transmit information on the determined available resources to cooperative communication cell member BSs which the serving BS manages.

In accordance with another aspect of the present disclosure, a cooperative communication cell member base station (BS) in a cooperative communication system is provided. The cooperative communication cell member BS includes a receiver configured to receive information on available resources which a serving BS determines from the serving BS, wherein the available resources are determined based on a base station identifier (BSID) of the serving BS and a BSID of each of other serving BSs included in the cooperative communication system.

In accordance with another aspect of the present disclosure, a serving base station (BS) in a cooperative communication system is provided. The serving BS includes a controller configured to detect a service flow characteristic of the serving BS and a service flow characteristic of each of other serving BSs included in the cooperative communication system, and determine an available resource which the serving BS will use and an available resource which each of other serving BSs will use based on the service flow characteristic of the serving BS and the service flow characteristic of each of the other serving BSs; and a transmitter configured to transmit information on the determined available resources to cooperative communication cell member BSs which the serving BS manages.

In accordance with another aspect of the present disclosure, a cooperative communication cell member base station (BS) in a cooperative communication system is provided. The cooperative communication cell member BS includes a receiver configured to receive information on available resources which a serving BS determines from the serving BS, wherein the available resources are determined based on a service flow characteristic of the serving BS and a service flow characteristic of each of other serving BSs included in the cooperative communication system.

In accordance with another aspect of the present disclosure, a method for allocating a resource in a serving base station (BS) in a cooperative communication system is provided. The method includes detecting a base station identifier (BSID) of the serving BS and a BSID of each of other serving BSs included in the cooperative communication system; determining an available resource which the serving BS will use and an available resource which each of other serving BSs will use based on the BSID of the serving BS and the BSID of each of the other serving BSs; and transmitting information on the determined available resources to cooperative communication cell member BSs which the serving BS manages.

In accordance with another aspect of the present disclosure, a method for receiving resource allocation information in a cooperative communication cell member base station (BS) in a cooperative communication system is provided. The method includes receiving information on available resources which a serving BS determines from the serving BS, wherein the available resources are determined based on a base station identifier (BSID) of the serving BS and a BSID of each of other serving BSs included in the cooperative communication system.

In accordance with another aspect of the present disclosure, a method for allocating a resource in a serving base station (BS) in a cooperative communication system is provided. The method includes detecting a service flow characteristic of the serving BS and a service flow characteristic of each of other serving BSs included in the cooperative communication system; determining an available resource which the serving BS will use and an available resource which each of other serving BSs will use based on the service flow characteristic of the serving BS and the service flow characteristic of each of the other serving BSs; and transmitting information on the determined available resources to cooperative communication cell member BSs which the serving BS manages.

In accordance with another aspect of the present disclosure, a method for receiving resource allocation information in a cooperative communication cell member base station (BS) in a cooperative communication system is provided. The method includes receiving information on available resources which a serving BS determines from the serving BS, wherein the available resources are determined based on a service flow characteristic of the serving BS and a service flow characteristic of each of other serving BSs included in the cooperative communication system.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
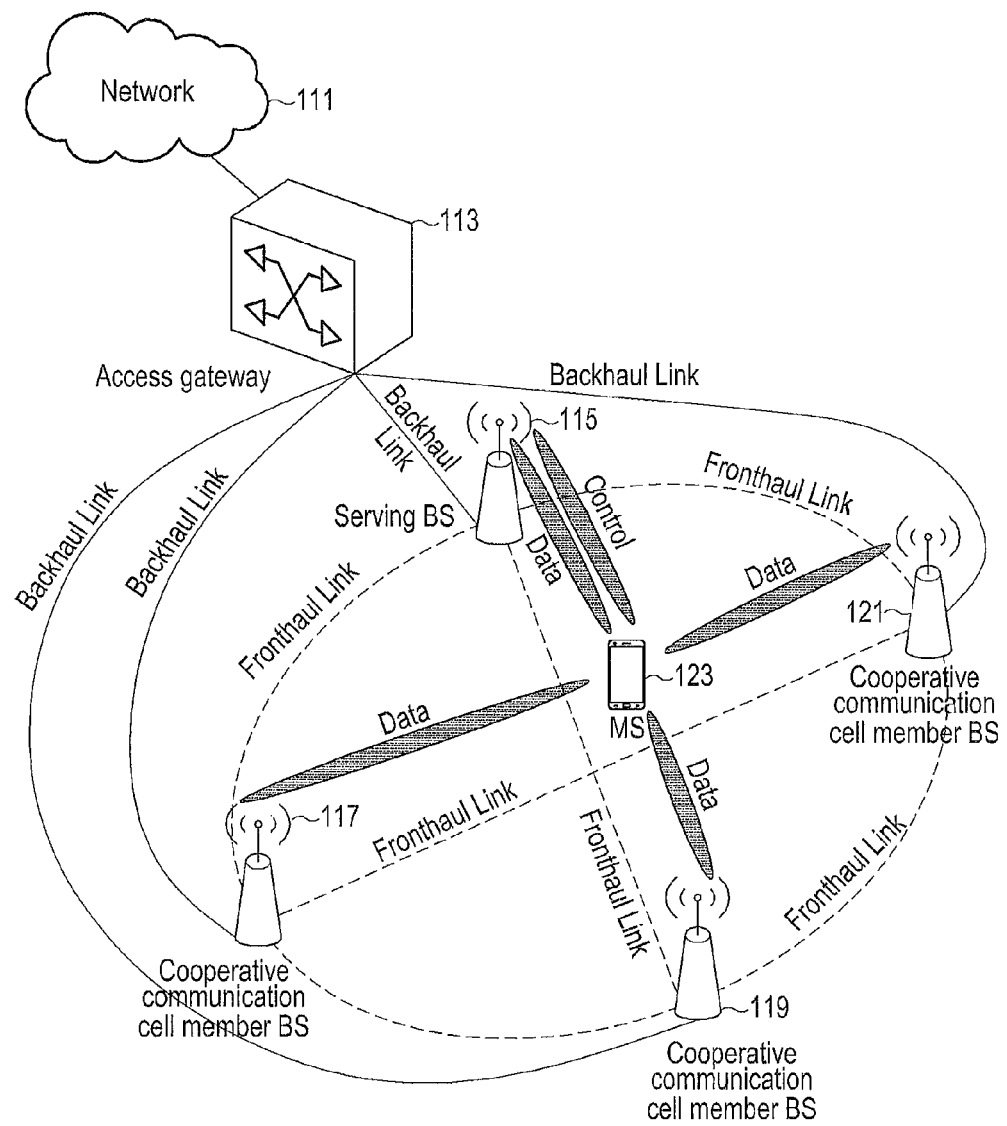
FIG. 1 schematically illustrates a structure of a cooperative communication system according to an embodiment of the present disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

An embodiment of the present disclosure proposes an apparatus and method for allocating a resource in a cooperative communication system.

An embodiment of the present disclosure proposes an apparatus and method for scheduling data in a cooperative communication system.

An embodiment of the present disclosure proposes an apparatus and method for scheduling data according to a change of a serving Base Station (BS) for a Mobile Station (MS) in a cooperative communication system.

An embodiment of the present disclosure proposes an apparatus and method for scheduling data using an inter-BS scheduling scheme according to a change of a serving BS for an MS in a cooperative communication system.

A method and apparatus proposed in various embodiments of the present disclosure can be applied to various communication systems such as a long term evolution (LTE) system, an LTE-advanced (LTE-A) system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) mobile communication system, an evolved packet system (EPS), a mobile internet protocol (Mobile IP) system, and/or the like.

FIG. 1 schematically illustrates a structure of a cooperative communication system according to an embodiment of the present disclosure.

Referring to FIG. 1, the cooperative communication system includes a network 111, an access gateway 113, a serving BS 115, cooperative communication cell member BSs 117, 119, and 121, and an MS 123. A cooperative communication cell consists of the serving BS 115 and the cooperative communication cell member BSs 117, 119, and 121. BSs included in the cooperative communication cell, i.e., the serving BS 115 and the cooperative communication cell member BSs 117, 119, and 121 join data transmission for the MS 123 using a multiple BS cooperation scheme. The BSs included in the cooperative communication cell shares information on the MS 123, can simultaneously join data scheduling for the MS 123, or can join the data scheduling for the MS 123 after a time interval.

The serving BS 115 performs a control signaling operation for the MS 123, and provides resource scheduling information of BSs which allocate downlink (DL) and uplink (UL) resources to the MS 123 among the BSs included in the cooperative communication cell to the MS 123. The serving BS 115 receives a measurement result for a reference signal transmitted from each neighbor BS from the MS 123, and updates information on BSs included in a cooperative communication cell according to the measurement result. The serving BS 115 transmits update information for the BSs included in the cooperative communication cell to the MS 123 and each of the BSs included in the cooperative communication cell. Each of the MS 123 and the BSs included in the cooperative communication cell updates information on the BSs included in the cooperative communication cell corresponding to the received update information.

In FIG. 1, the number of cooperative communication cell member BSs is 3, that is, the cooperative communication cell member BSs are cooperative communication cell member BSs 117, 119, and 121. However, it will be understood by those of ordinary skill in the art that the number of cooperative communication cell member BSs is not limited. An embodiment of the present disclosure proposes an apparatus and method for scheduling data in a case that the serving BS 115 for the MS 123 changes, the detailed description of the apparatus and method for scheduling the data will be followed, so a detailed description thereof will be omitted herein.

Meanwhile, a case that a data forwarding method occurred in a handover procedure of an MS in an LTE mobile communication system is applied to the cooperative communication system in FIG. 1 will be considered, so the detailed description will be followed.

In a cooperative communication system in FIG. 1, if an MS performs a handover procedure, not only a serving BS but also other BSs included in a cooperative communication cell, i.e., cooperative communication cell member BSs should transmit data to the MS according to link status. That is, in the cooperative communication system, if the MS performs the handover procedure, a joint transmission situation or a dynamic point selection situation occurs. If the joint transmission situation or the dynamic point selection situation occurs, the serving BS forwards data through a direct connection link between BSs, i.e., a front haul link in order for the cooperative communication cell member BSs to join data transmission.

If a serving BS is changed according to performing a handover procedure of an MS, a control right for the MS is transferred to a new serving BS. In this case, the new serving BS receives data from the old serving BS and should forward the received data to a BS which joins data transmission with the new serving BS if the described data forwarding operation occurs. If the new serving BS not the old serving BS forwards the data to cooperative communication cell member BSs, latency can increase according that the new serving BS receives data and transmits the data to the cooperative communication cell member BSs. So, an unnecessary data forwarding operation through a front haul link among BSs is repeated.

In an embodiment of the present disclosure, an apparatus and method for scheduling data in a cooperative communication system are proposed in order to prevent the unnecessary data forwarding operation, so a detailed description will be followed.

In order to configure and update a cooperative communication cell in the cooperative communication system in FIG. 1, there is a need for a serving BS change operation and a cooperative communication cell member BS update operation. A detailed description of the serving BS change operation and the cooperative communication cell member BS update operation will be followed.

(1) Serving BS Change Operation

A serving BS represents a BS which transmits control information within a cooperative communication cell, e.g., MAP information, a signaling message, etc. Signaling among a serving BS and cooperative communication cell member BSs within the cooperative communication cell is performed through a front haul link among BSs. A BS which an MS initially access after power on automatically becomes a serving BS, and the serving BS for the MS can be changed based on various parameters such as a reference signal measurement result of the MS or traffic load of the serving BS.

The serving BS transmits data to an MS and receives data from the MS through a cooperative communication among cooperative communication cell member BSs within a cooperative communication cell. Various cooperative communication schemes such as transmission schemes used in a CoMP communication system, e.g., a joint transmission scheme, a joint processing scheme, a dynamic point selection scheme, etc. can be used in the cooperative communication. The detailed description of the joint transmission scheme, the joint processing scheme, and the dynamic point selection scheme will be omitted.

The serving BS determines cooperative communication cell member BSs included in a cooperative communication cell based on reference signal measurement result for neighbor BSs of the MS, and performs a cooperative communication cell update operation through signaling with related cooperative communication cell member BSs. Upon detecting that there is a need for changing a control point, i.e., a serving BS for a specific MS, the serving BS transfers a control right for the specific MS to a new serving BS by performing a signaling transaction operation related to serving BS change with cooperative communication cell member BSs. That is, the serving BS change means that any cooperative communication cell member BS among cooperative communication cell member BSs included in a cooperative communication cell became a new serving BS. In this case, an old serving BS can be a cooperative communication cell member BS for the specific MS, or can be deleted from a cooperative communication cell for the specific MS. The detailed description for the case that the old serving BS is deleted from the cooperative communication cell for the specific MS will be omitted.

(2) Cooperative Communication Cell Member BS Update Operation

A cooperative communication cell member BS is included in a cooperative communication cell for a specific MS, and represents a BS which joins a cooperative communication for data transmission/reception with the specific MS under a control of a serving BS.

Generally, neighbor BSs for an MS are included in a cooperative communication cell as cooperative communication cell member BSs, so a detailed description will be followed.

The MS reports a measurement result for a reference signal transmitted from each neighbor BS to a serving BS, and the serving BS performs procedures such as a capacity negotiation procedure with the neighbor BSs based on the measurement result received from the MS. The serving BS selects neighbor BSs to be included in the cooperative communication cell among the neighbor BSs and determines the selected neighbor BSs as cooperative communication cell member BSs. The operation for selecting the cooperative communication cell member BSs is continuously performed based on a reference signal measurement result report for neighbor BSs of an MS, so cooperative communication cell member BSs are updated. The cooperative communication cell member BS update operation is continuously performed. The cooperative communication cell member BS selection operation and the cooperative communication cell member BS update operation can be performed based on a preset period or as necessary. Further, an arbitrary BS can operate as a serving BS for a specific MS and operate as a cooperative communication cell member BS for other MSs.

A front haul link among BSs exists for the operations necessary for cooperative communication cell configuration and update, e.g., the serving BS change operation and the cooperative communication cell member BS update operation, control information and DL data traffic are forwarded from a serving BS to cooperative communication cell member BSs through the front haul link.

On the other hand, control information, feedback information and UL data traffic are forwarded from the cooperative communication cell member BSs to the serving BS through the front haul link.

A process for performing a cooperative communication cell member BS update operation in a cooperative communication cell communication system according to an embodiment of the present disclosure will be described with reference to FIGS. 2A to 2B.

Figure 2A:
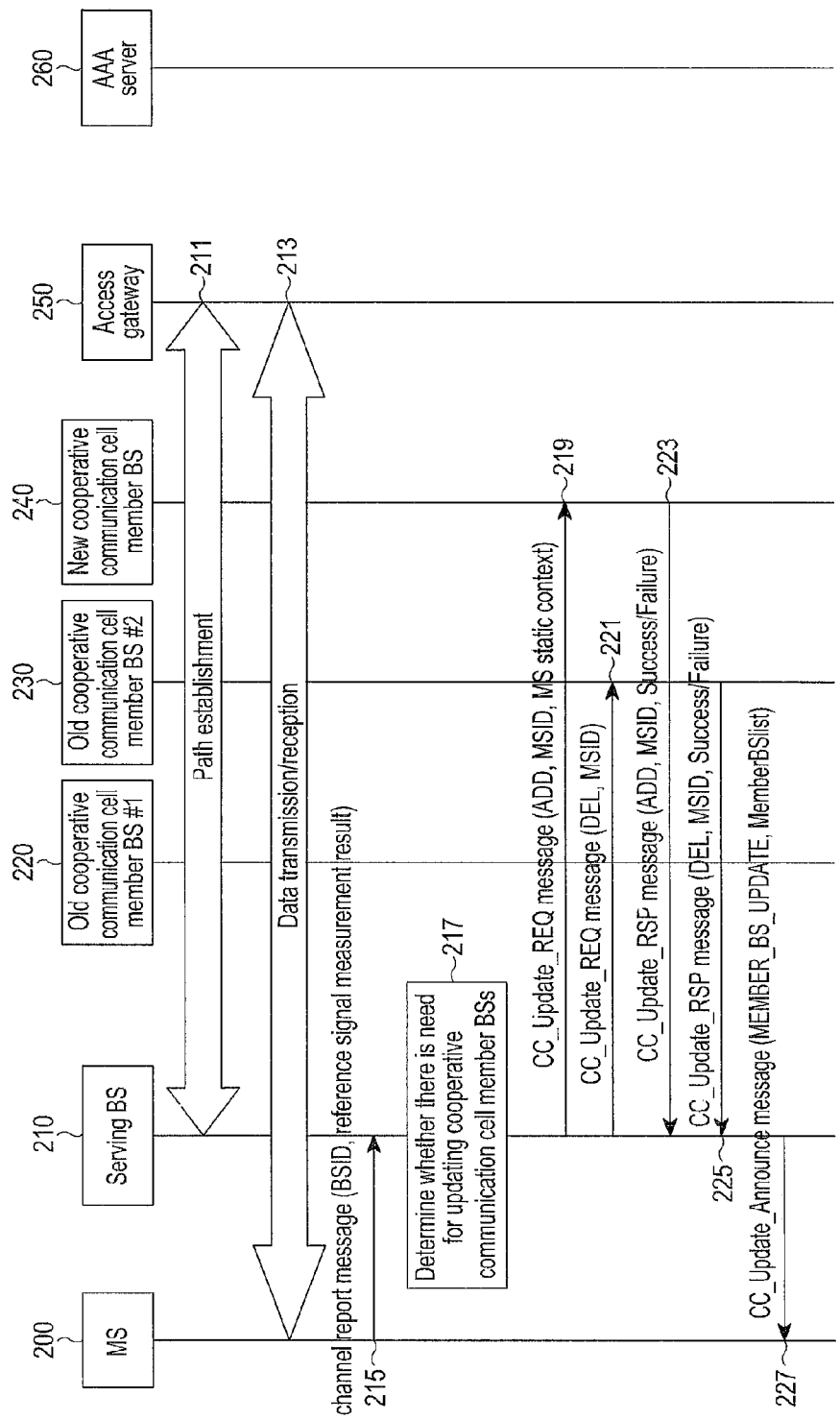
FIGS. 2A to 2B schematically illustrate a process for performing a cooperative communication cell member BS update operation in a cooperative communication system according to an embodiment of the present disclosure.
Figure 2B:
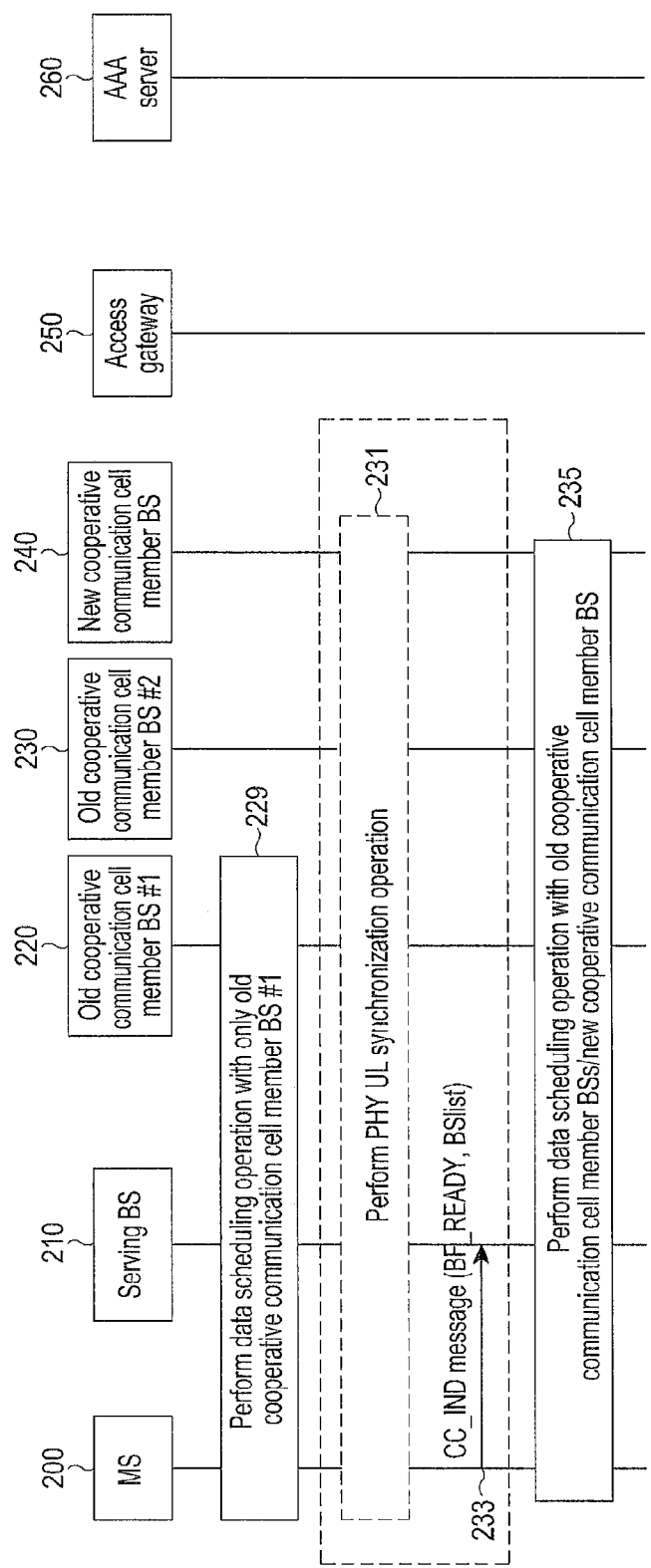

FIGS. 2A to 2B schematically illustrate a process for performing a cooperative communication cell member BS update operation in a cooperative communication cell communication system according to an embodiment of the present disclosure.

Referring to FIGS. 2A to 2B, the cooperative communication system includes an MS 200, a serving BS 210, old cooperative communication cell member BSs, i.e., a cooperative communication cell member BS #1 220 and a cooperative communication cell member BS #2 230, a new cooperative communication cell member BS 240, an access gateway 250, and an authorization, authentication and accounting (AAA) server 260.

A path has been established between the serving BS 210 and the access gateway 250 (operation 211). Data transmission/reception is performing between the serving BS 210 and the access gateway 250 (operation 213). In this status, the MS 200 transmits measurement result for a reference signal received from each of neighbor BSs to the serving BS 210 using a channel report message (operation 215). For example, the channel report message can include a BS identifier (BSID) for each neighbor BS to which the MS 200 reports the measurement result, measurement result for a reference signal transmitted from a related neighbor BS, etc. The measurement result for the reference signal can be channel quality information (CQI) as short-term measurement result, or one of a received signal strength indication (RSSI), a carrier to interference and noise ratio (CINR), a signal to interference and noise ratio (SINR), etc. as long-term measurement result. The measurement result can be one of various formats other than the CQI, the RSSI, the CINR, and the SINR.

The serving BS 210 receiving the channel report message from the MS 200 determines whether there is a need for updating cooperative communication cell member BSs included in a cooperative communication cell using the measurement result for the reference signal included in the channel report message (operation 217). In FIGS. 2A to 2B, it will be assumed that the serving BS 210 determines that there is the need for updating the cooperative communication cell member BSs included in the cooperative communication cell, and more specially, determines to add the new cooperative communication cell member BS 240 to the cooperative communication cell and to delete the old cooperative communication cell member BS #2 230 from the cooperative communication cell. As not shown in FIGS. 2A to 2B, it will be understood by those of ordinary skill in the art that a procedure related to a cooperative communication cell member BS update operation to be described below is not performed if the serving BS 210 determines that there is no need for updating the cooperative communication cell member BSs included in the cooperative communication cell.

The serving BS 210 transmits a cooperative communication cell update request (CC_Update_REQ) message to the new cooperative communication cell member BS 240 (operation 219). The CC_Update_REQ message includes an ADD, an MSID, and an MS static context. The MSID represents an MS identifier (MSID), the ADD represents a parameter indicating that a related BS is added to a cooperative communication cell for an MS with a related MSID as a cooperative communication cell member BS, and the MS static Context represents a static context for the related MS. In FIGS. 2A to 2B, the MS static context is included in the CC_Update_REQ message, however, the MS static context can be only transmitted to a BS which allows to operate as a cooperative communication cell member BS for the MS 200 through a message other than the CC_Update_REQ message, e.g., a cooperative communication cell update announce (CC_Update_Announce) message.

The serving BS 210 transmits a CC_Update_REQ message to the old cooperative communication cell member BS 230 (operation 221). The CC_Update_REQ message includes a DEL and an MSID. The DEL represents a parameter indicating that a related BS is deleted from a cooperative communication cell for an MS with a related MSID. That is, the DEL represents a parameter indicating that the related BS which has been a cooperative communication cell member BS is deleted from the cooperative communication cell for the MS with the related MSID.

After receiving the CC_Update_REQ message, the new cooperative communication cell member BS 240 determines whether the new cooperative communication cell member BS 240 can operate a cooperative communication cell member BS for the MS 200, and transmits a Cooperative communication cell update rerponse (CC_Update_RSP) message according to the determining result (operation 223). The CC_Update_RSP message transmitted from the new cooperative communication cell member BS 240 to the serving BS 210 includes an ADD, an MSID, a Success or Failure. The Success represents a parameter indicating that a related BS will be added as a cooperative communication cell member BS for an MS with the MSID, and the Failure represents a parameter indicating that the related BS will not be added as the cooperative communication cell member BS for the MS with the MSID. In FIGS. 2A to 2B, it will be assumed that the Success is included into the CC_Update_RSP message transmitted from the new cooperative communication cell member BS 240 to the serving BS 210.

After receiving the CC_Update_REQ message, the cooperative communication cell member BS #2 230 determines whether the cooperative communication cell member BS #2 230 can be deleted from the cooperative communication cell for the MS 200, and transmits a CC_Update_RSP message to the serving BS 210 according to the determining result (operation 225). The CC_Update_RSP message transmitted from the cooperative communication cell member BS #2 230 to the serving BS 210 includes a DEL, an MSID, a Success or Failure. The Success represents a parameter indicating that a related BS will be deleted from a cooperative communication cell for an MS with the MSID, and the Failure represents a parameter indicating that the related BS will not be deleted from the cooperative communication cell for the MS with the MSID. In FIGS. 2A to 2B, it will be assumed that the Success is included into the CC_Update_RSP message transmitted from the cooperative communication cell member BS #2 230 to the serving BS 210.

After receiving the CC_Update_RSP message from each of the new cooperative communication cell member BS 240 and the cooperative communication cell member BS #2 230, the serving BS 210 detects a final cooperative communication cell configuration result by analyzing the CC_Update_RSP message received from the each of the new cooperative communication cell member BS 240 and the cooperative communication cell member BS #2 230 and notifies the detected final cooperative communication cell configuration result to the MS 200 using a CC_Update_Announce message (operation 227). The CC_Update_Announce message includes a MEMBER_BS_UPDATE and a MemberBSlist. The MEMBER_BS_UPDATE represents a parameter indicating that a cooperative communication cell member BS has been updated, and the MemberBSlist represents a parameter indicating a cooperative communication cell member BS list for the MS 200. That is, the MemberBSlist includes BSIDs of cooperative communication cells for the MS 200.

After receiving the CC_Update_Announce message, the MS 200 detects the MEMBER_BS_UPDATE and the MemberBSlist from the CC_Update_Announce message and can know that the cooperative communication cell member BS has been updated in a way in which the cooperative communication cell member BS #2 230 has been deleted from the cooperative communication cell for the MS 200 and the new cooperative communication cell member BS 240 has been added to the cooperative communication cell for the MS 200.

In a case that the MS 200 has not completed a physical layer (PHY) UL synchronization operation for the new cooperative communication cell member BS 240, the serving BS 210 does not involve the new cooperative communication cell member BS 240 in data scheduling for the MS 200, i.e., a cooperative communication and involves only the cooperative communication cell member BS #1 220 as an old cooperative communication cell member BS in the data scheduling for the MS 200 until the MS 200 completes the PHY UL synchronization operation with the new cooperative communication cell member BS 240 (operation 229).

After completing the PHY UL synchronization operation with the new cooperative communication cell member BS 240 (operation 231), the MS 200 transmits a cooperative communication cell indication (CC_IND) message to the serving BS 210 (operation 233). If the cooperative communication system uses a beam forming scheme, the MS 200 can select an optimal beam according to the completion of the PHY UL synchronization operation with the new cooperative communication cell member BS 240. The CC_IND message includes a BF_READY and a BSlist. The BF_READY represents a parameter indicating that the MS 200 completed a beam selection operation with the new cooperative communication cell member BS 240 if the cooperative communication system uses the beam forming scheme, and the BSlist represents a list indicating all BSs for which the MS 200 completed the beam selection operation, i.e., which can transmit/receive data. As a result, the BSlist represents all BSs included in the cooperative communication cell, that is, the BSlist includes a BSID of all of the BSs included in the cooperative communication cell, so a BSID of the new cooperative communication cell member BS 240 is included in the BSlist.

After receiving the CC_IND message from the MS 200, the serving BS 210 involves the new cooperative communication cell member BS 240 in the data scheduling for the MS 200 (operation 235). The new cooperative communication cell member BS 240 does not have to be involved in the data scheduling for the MS 200, and is involved in the data scheduling for the MS 200 according to situation of the cooperative communication system.

Meanwhile, operations 229 to 235 are performed because it will be assumed that the MS 200 should perform the PHY UL synchronization operation for all cooperative communication cell member BSs included in the cooperative communication cell in the cooperative communication system. If the MS 200 performs the PHY UL synchronization operation for only the serving BS 210 in the cooperative communication system, that is, if the MS 200 transmits UL data and a UL control message to only the serving BS 210, operations 229 to 235 do not have to be performed.

Although FIGS. 2A to 2B illustrate a process for performing a cooperative communication cell member BS update operation in a cooperative communication cell communication system according to an embodiment of the present disclosure, various changes could be made to FIGS. 2A to 2B. For example, although shown as a series of operations, various operations in FIGS. 2A to 2B could overlap, occur in parallel, occur in a different order, or occur multiple times.

A process for performing a cooperative communication cell member BS update operation in a cooperative communication cell communication system according to an embodiment of the present disclosure has been described with reference to FIGS. 2A to 2B, and a process for performing a serving BS change operation in a cooperative communication system according to an embodiment of the present disclosure will be described with reference to FIGS. 3A to 3B.

Figure 3A:
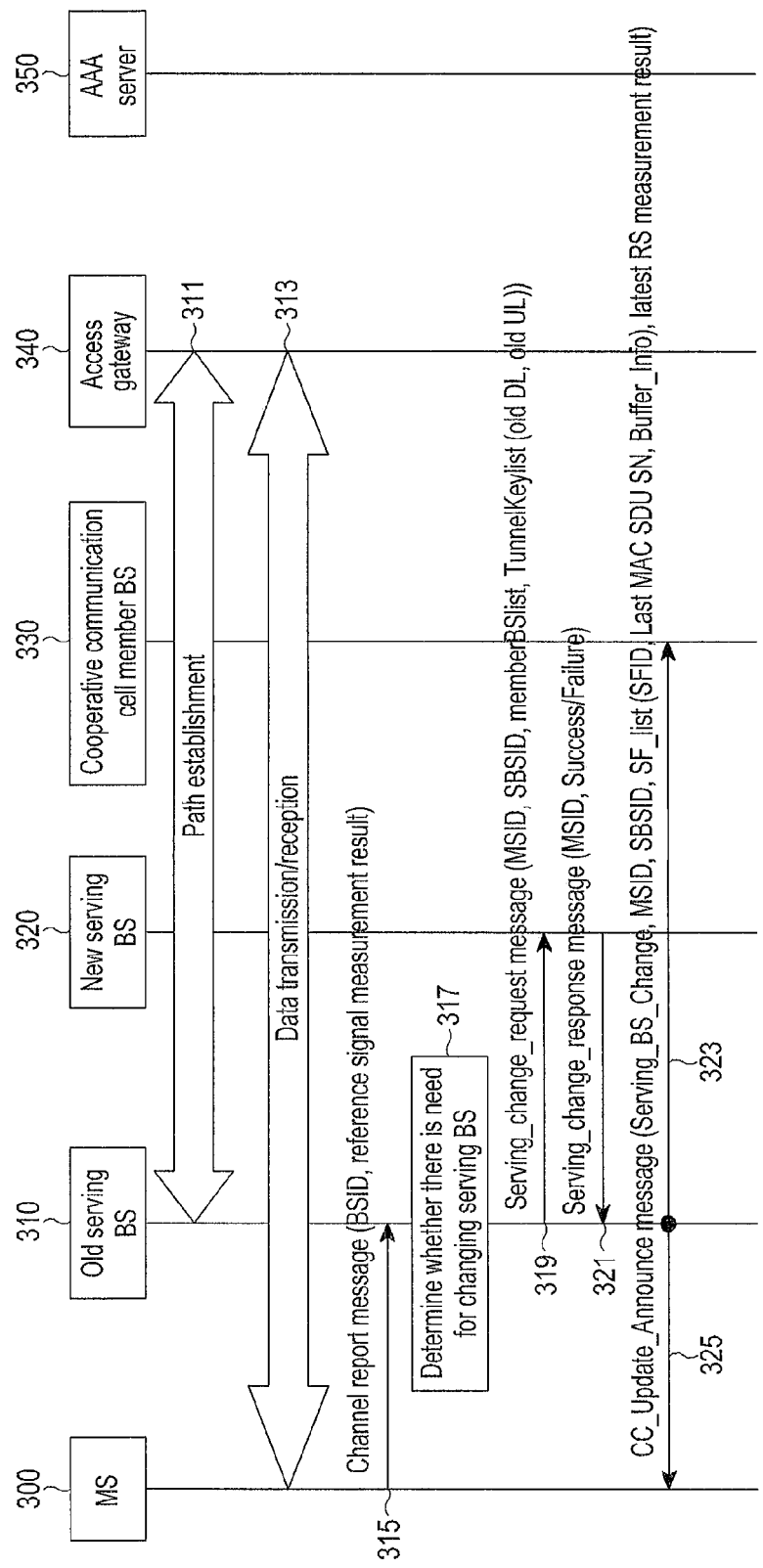
FIGS. 3A to 3B schematically illustrate a process for performing a serving BS change operation in a cooperative communication system according to an embodiment of the present disclosure.
Figure 3B:
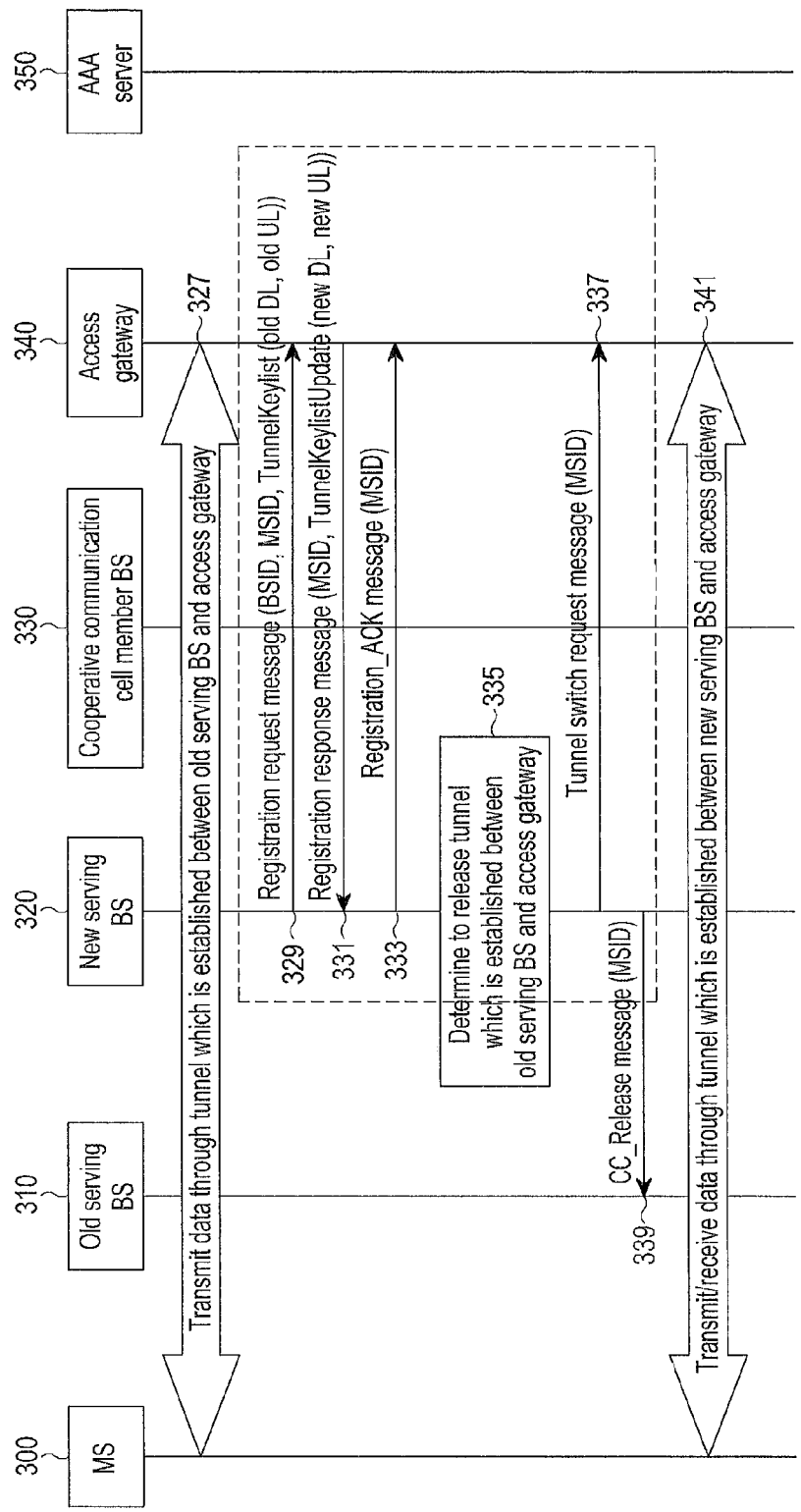

FIGS. 3A to 3B schematically illustrate a process for performing a serving BS change operation in a cooperative communication system according to an embodiment of the present disclosure.

Referring to FIGS. 3A to 3B, the cooperative communication system includes an MS 300, an old serving BS 310, a new serving BS 320, a cooperative communication cell member BS 330, an access gateway 340, and an AAA server 350.

A path has been established between the old serving BS 310 and the access gateway 340 in operation 311. Data transmission/reception is performing between the MS 300 and the access gateway 340 in operation 313. In this status, the MS 300 transmits measurement result for a reference signal received from each of neighbor BSs to the old serving BS 310 using a channel report message in operation 315. For example, the channel report message can include a BSID for each neighbor BS to which the MS 300 reports the measurement result, measurement result for a reference signal transmitted from a related neighbor BS, etc. The measurement result for the reference signal can be one of various formats such as a CQI, a RSSI, a CINR, an SINR, etc.

After receiving the channel report message from the MS 300, the old serving BS 310 determines whether there is a need for changing a serving BS based on the measurement result included in the channel report message in operation 317. In FIGS. 3A to 3B, it will be assumed that the old serving BS 310 determines that there is a need for changing the serving BS, and, more specially, the old serving BS 310 determines that the new serving BS 320 is a serving BS to be changed. As not shown in FIGS. 3A to 3B, if the old serving BS 310 determines that there is no need for changing the serving BS, a serving BS change operation to be described below can be omitted.

After determining the serving BS change, the old serving BS 310 transmits a serving_change_request message to the new serving BS 320 (operation 319). The serving_change_request message includes an MSID, an SBSID, a memberBSlist, and a TunnelKeylist (old DL, old UL). The MSID represents an MSID of an MS for which a serving BS should be changed, i.e., the MS 300, the SBSID (serving BSID) represents a BSID of a new serving BS, i.e., the new serving BS 320, the memberBSlist represents a cooperative communication cell member list for the MS 300, and the TunnelKeylist (old DL, old UL) represents a tunnel key list used in a DL and a UL of an old serving BS, i.e., the old serving BS 310. The tunnel key is a key used in a tunnel established between the old serving BS 310 and the access gateway 340, and the tunnel is generated per a service flow for the MS 300.

After receiving the serving_change_request message, the new serving BS 320 transmits a serving_change_response message as a response message to the serving_change_request message to the old serving BS 310 in operation 321. The serving_change_response message includes an MSID, a Success or Failure. The Success represents a parameter indicating that a related BS will be changed as a serving BS for an MS with the MSID, and the Failure represents a parameter indicating that the related BS will not be changed as the serving BS for the MS with the MSID. In FIGS. 3A to 3B, it will be assumed that the Success is included into the serving_change_response message transmitted from the new serving BS 320 to the old serving BS 310.

After receiving the serving_change_response message, the old serving BS 310 transmits a CC_Update_Announce message in order to notify the MS 300 and the cooperative communication cell member BS 330 that the new serving BS 320 is changed as a new serving BS in operations 323 and 325. The CC_Update_Announce message transmitted to the MS 300 and the cooperative communication cell member BS 330 includes a serving_BS_change, an MSID, an SBSID (new serving BSID), an SF_list (SFID, Last MAC SDU SN, Buffer_Info), and a latest Reference Signal (RS) measurement result. The serving_BS_change is one of types of the CC_Update_Announce message, and a parameter indicating that a serving BS has been changed. The SF_list is a parameter indicating a service flow list. The SF_list includes a service flow identifier (SFID) indicating an ID of a service flow established for the MS 300, a Last MAC SDU SN indicating a serial number (SN) of a medium access control (MAC) service data unit (SDU) which has been lastly processed for a related service flow in the old serving BS 310, and a Buffer_Info indicating buffer information. The latest RS measurement result is a parameter representing a measurement result which the MS 300 has transmitted lastly to the old serving BS 310. The Buffer_Info represents the buffer information, i.e., the number of MAC SDUs which are currently buffered and a size of each of the MAC SDUs. The new serving BS 320 can control data scheduling for the old serving BS 310 based on the Buffer_Info.

The Latest RS measurement Result is used in order that the new serving BS 320 determines a modulation and coding scheme (MCS) which is appropriate for the data scheduling for the MS 300.

The new serving BS 320 has not yet established a tunnel with the access gateway 340, and the access gateway 340 has not yet recognized that a serving BS has been changed. So, the access gateway 340 continuously transmits data which the MS 300 should receive to the old serving BS 310 in operation 327.

So, there is a need for establishing a new tunnel between the new serving BS 320 and the access gateway 340, the new serving BS 320 transmits a registration request message to the access gateway 340 in operation 329. The registration request message includes a BSID, an MSID, and a TunnelKeylist (old DL, old UL). The BSID represents a BSID of the new serving BS 320, and the TunnelKeylist (old DL, old UL) represents a tunnel key list for an old DL and an old UL used between the old serving BS 310 and the access gateway 340. That is, the TunnelKeylist (old DL, old UL) includes tunnel keys for the old DL and the old UL used between the old serving BS 310 and the access gateway 340.

After receiving the registration request message, the access gateway 340 transmits a registration response message as a response message to the registration request message to the new serving BS 320 in operation 331. The registration response message includes an MSID and a TunnelKeylistUpdate (new DL, new UL). The TunnelKeylistUpdate (new DL, new UL) represents a tunnel key list for a new DL and a new UL which will be newly established between the new serving BS 320 and the access gateway 340. That is, the TunnelKeylistUpdate (new DL, new UL) includes tunnel keys for the new DL and the new UL which will be newly established between the new serving BS 320 and the access gateway 340.

After receiving the registration response message, the new serving BS 320 transmits a registration acknowledgement (registration_ACK) message to the access gateway 340 in operation 333. After transmitting the registration_ACK message, the new serving BS 320 determines release of the tunnel between the old serving BS 310 and the access gateway 340 since there is no need for maintaining the tunnel between the old serving BS 310 and the access gateway 340 in operation 335. The new serving BS 320 transmits a tunnel switch request message to the access gateway 340 in operation 337, and transmits a cooperative communication cell release (CC_Release) message to the old serving BS 310 in operation 339. After receiving the tunnel switch request message, the access gateway 340 releases the tunnel established with the old serving BS 310, and activates the tunnel established with the new serving BS 320. That is, the tunnel established between the access gateway 340 and the new serving BS 320 is activated if the new serving BS 320 transmits the tunnel switch request message to the access gateway 340.

Although not shown in FIGS. 3A to 3B, it will be understood by those of ordinary skill in the art that a process for transmitting and/or receiving a response message to the CC_Release message and a process for transmitting and/or receiving a response message to the tunnel switch request message can be performed. Here, the response message to the CC_Release message and the response message to the tunnel switch request message can be implemented as a hybrid automatic retransmission request (HARM) ACK message or a new message, e.g., a CC_Release RSP message and a tunnel switch response message.

Thereafter, the MS 300, the new serving BS 320 and the access gateway 340 transmit/receive data through the newly established tunnel in operation 341.

Although FIGS. 3A to 3B illustrate a process for performing a serving BS change operation in a cooperative communication system according to an embodiment of the present disclosure, various changes could be made to FIGS. 3A to 3B. For example, although shown as a series of operations, various operations in FIGS. 3A to 3B could overlap, occur in parallel, occur in a different order, or occur multiple times.

As described above, if a serving BS change operation is performed in a cooperative communication system, a data scheduling operation is performed between an old serving BS and a new serving BS. A process for performing a data scheduling operation proposed in embodiments of the present disclosure will be described with reference to FIGS. 4A to 4B, 5A to 5B, 6A to 6B, and 7A to 7C.

Figure 4A:
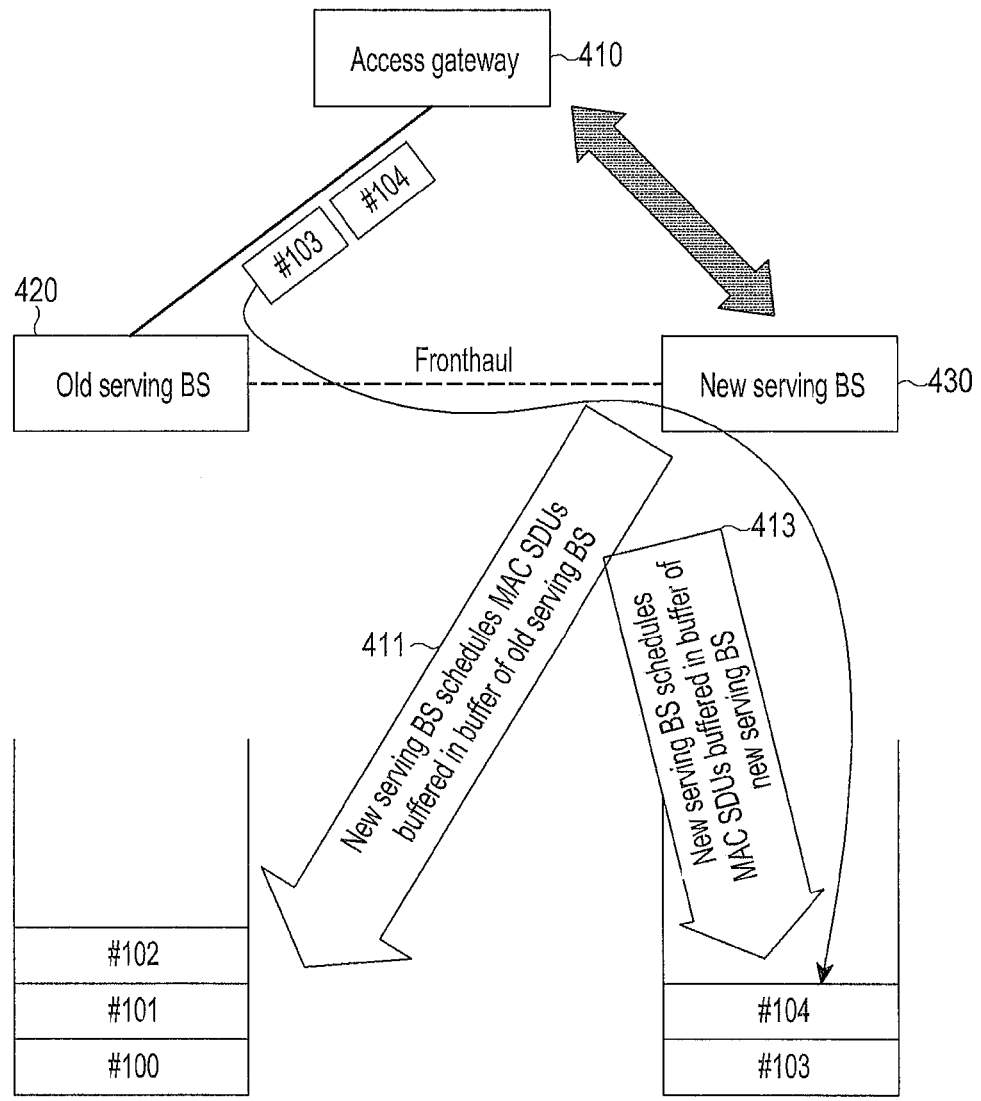
FIGS. 4A to 4B schematically illustrate a process for performing a data scheduling operation which is performed between an old serving BS and a new serving BS according to serving BS change in a cooperative communication system according to an embodiment #1 of the present disclosure.
Figure 4B:
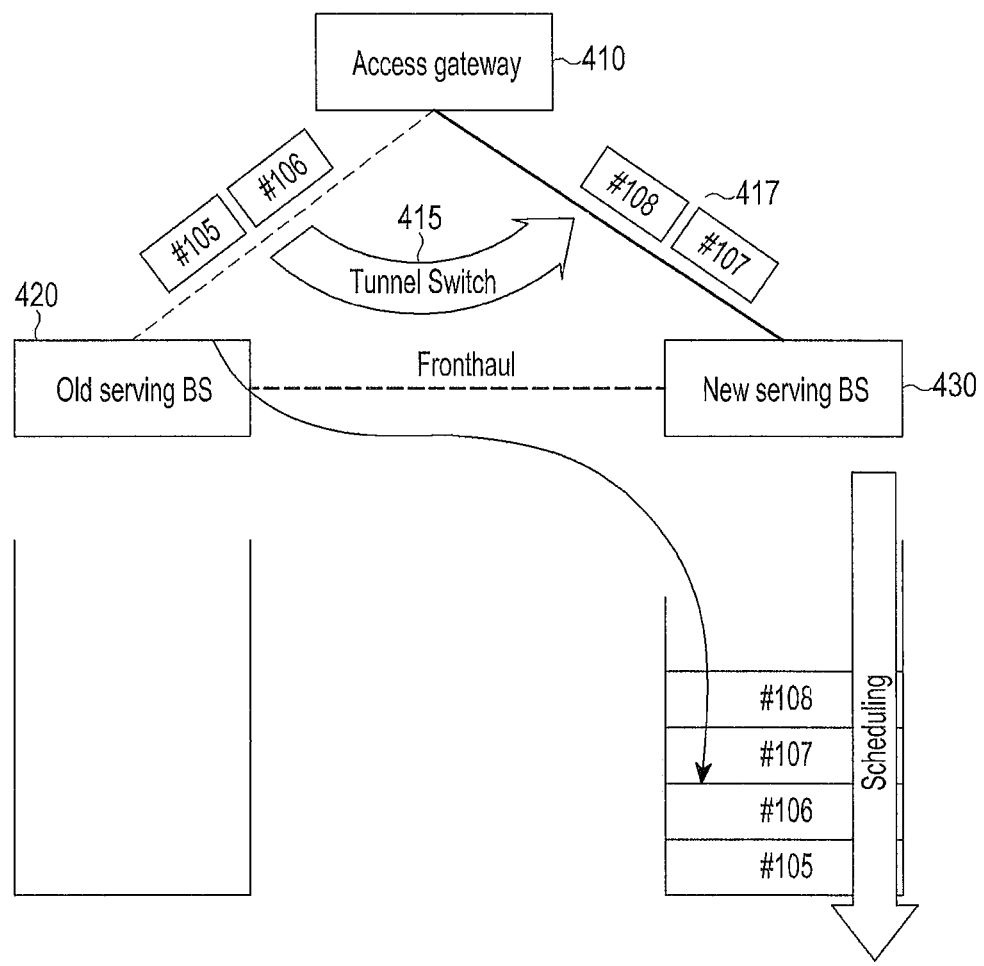

FIGS. 4A to 4B schematically illustrate a process for performing a data scheduling operation which is performed between an old serving BS and a new serving BS according to serving BS change in a cooperative communication system according to the first embodiment of the present disclosure.

Referring to FIGS. 4A to 4B, the cooperative communication system includes an access gateway 410, an old serving BS 420, and a new serving BS 430.

If a serving BS is changed according that an old serving BS 420 transmits a CC_Update_Announce message to a new serving BS 430, the new serving BS 430 has a control right for all cooperative communication cell member BSs included in a cooperative communication cell for an MS 400 (not shown in FIGS. 4A to 4B). In this case, data which the MS 400 will receive can be buffered in a buffer of the old serving BS 420, so the new serving BS 430 can know quantity of the data buffered in the buffer of the old serving BS 420 using a LAST MAC SDU SN and Buffer_Info included in the CC_Update_Announce message.

So, in the first embodiment of the present disclosure, although a serving BS is changed, the old serving BS 420 does not forward all data, i.e., all MAC SDUs buffered in the buffer of the old serving BS 420 to the new serving BS 430 until a tunnel between the new serving BS 430 and the access gateway 410 is activated. So, the old serving BS 420 forwards only a MAC SDU received through a tunnel established between the access gateway 410 and the old serving BS 420 to the new serving BS 430 after a serving BS is changed. So, the new serving BS 430 schedules MAC SDUs buffered in the buffer of the old serving BS 420 in operation 411, and forwards scheduling control information for MAC SDUs buffered in the buffer of the old serving BS 420 to all cooperative communication cell member BSs within a cooperative communication cell through a front haul link. In operation 411, the new serving BS 430 forwards the scheduling control information to all cooperative communication cell member BSs within the cooperative communication cell, however, it will be understood by those of ordinary skill in the art that the new serving BS 430 can forward the scheduling control information to some of cooperative communication cell member BSs within the cooperative communication cell according to a selection of the new serving BS 430. That is, the new serving BS 430 can select some of cooperative communication cell member BSs within the cooperative communication cell using a reference signal measurement result and various parameters such as load of a related cooperative communication cell member BS and forward the scheduling control information to the selected cooperative communication cell member BSs.

After completing a process for the MAC SDUs buffered in the buffer of the old serving BS 420, the new serving BS 430 schedules MAC SDUs buffered in a buffer of the new serving BS 430 in operation 413. The MS 400 continuously reports a measurement result for neighbor BSs to the new serving BS 430.

In FIG. 4A, a MAC SDU#100 to a MAC SDU#102 indicate MAC SDUs buffered in the buffer of the old serving BS 420 before the serving BS is changed, and a MAC SDU #103 to a MAC SDU #104 indicate MAC SDUs which are transmitted from the access gateway 410 to the old serving BS 420 after the serving BS is changed and forwarded to the new serving BS 430.

If a tunnel between the new serving BS 430 and the access gateway 410 is established and there is no MAC SDU buffered in the buffer of the old serving BS 420, the new serving BS 430 transmits a tunnel switch request message to the access gateway 410 in order to receive a MAC SDU targeting the MS 400. According to transmission of the tunnel switch request message, the tunnel established between the old serving BS 420 and the access gateway 410 is switched to the tunnel established between the new serving BS 430 and the access gateway 410 in operation 415. So, the tunnel established between the new serving BS 430 and the access gateway 410 is activated.

At operation 415, the new serving BS 430 transmits the tunnel switch request message to the access gateway 410 if there is no MAC SDU buffered in the buffer of the old serving BS 420. However, it will be understood by those of ordinary skill in the art that the new serving BS 430 can transmit the tunnel switch request message to the access gateway 410 after completing a registration process, i.e., a process for transmitting/receiving a registration_REQ message and a registration_RSP message. That is, normal data scheduling of the new serving BS 430 is possible even if the new serving BS 430 transmits the tunnel switch request message on processing a MAC SDU buffered in the buffer of the old serving BS 420.

After the tunnel established between the new serving BS 430 and the access gateway 410 is activated, the new serving BS 430 receives MAC SDUs from the access gateway 410 in operation 417.

In FIG. 4B, a MAC SDU#105 to a MAC SDU#106 indicate MAC SDUs which the old serving BS 420 receives from the access gateway 410 and forwards to the new serving BS 430 before the tunnel established between the new serving BS 430 and the access gateway 410 after the serving BS is changed. A MAC SDU #107 and a MAC SDU #108 indicate MAC SDUs which the new serving BS 430 receives from the access gateway 410 through an activated tunnel between the new serving BS 430 and the access gateway 410.

The new serving BS 430 schedules MAC SDUs buffered in a buffer of the new serving BS 430 regardless of whether the tunnel established between the new serving BS 430 and the access gateway 410 is activated if transmission for MAC SDUs buffered in a buffer of the old serving BS 420 is exhausted. In this case, the new serving BS 430 can control cooperative communication cell member BSs within a cooperative communication cell to process a MAC SDU through a front haul link.

As described in FIGS. 4A to 4B, in a cooperative communication system, even if an old serving BS does not forward all data to a new serving BS when a serving BS is changed, the new serving BS can prevent unnecessary latency by performing an Inter-BS scheduling operation.

A process for performing a data scheduling operation which is performed between an old serving BS and a new serving BS according to serving BS change in a cooperative communication system according to the first embodiment of the present disclosure has been described with reference to FIGS. 4A to 4B, and a process for performing a data scheduling operation which is performed between an old serving BS and a new serving BS according to serving BS change in FIGS. 4A to 4B will be described with reference to FIGS. 5A to 5B.

Figure 5A:
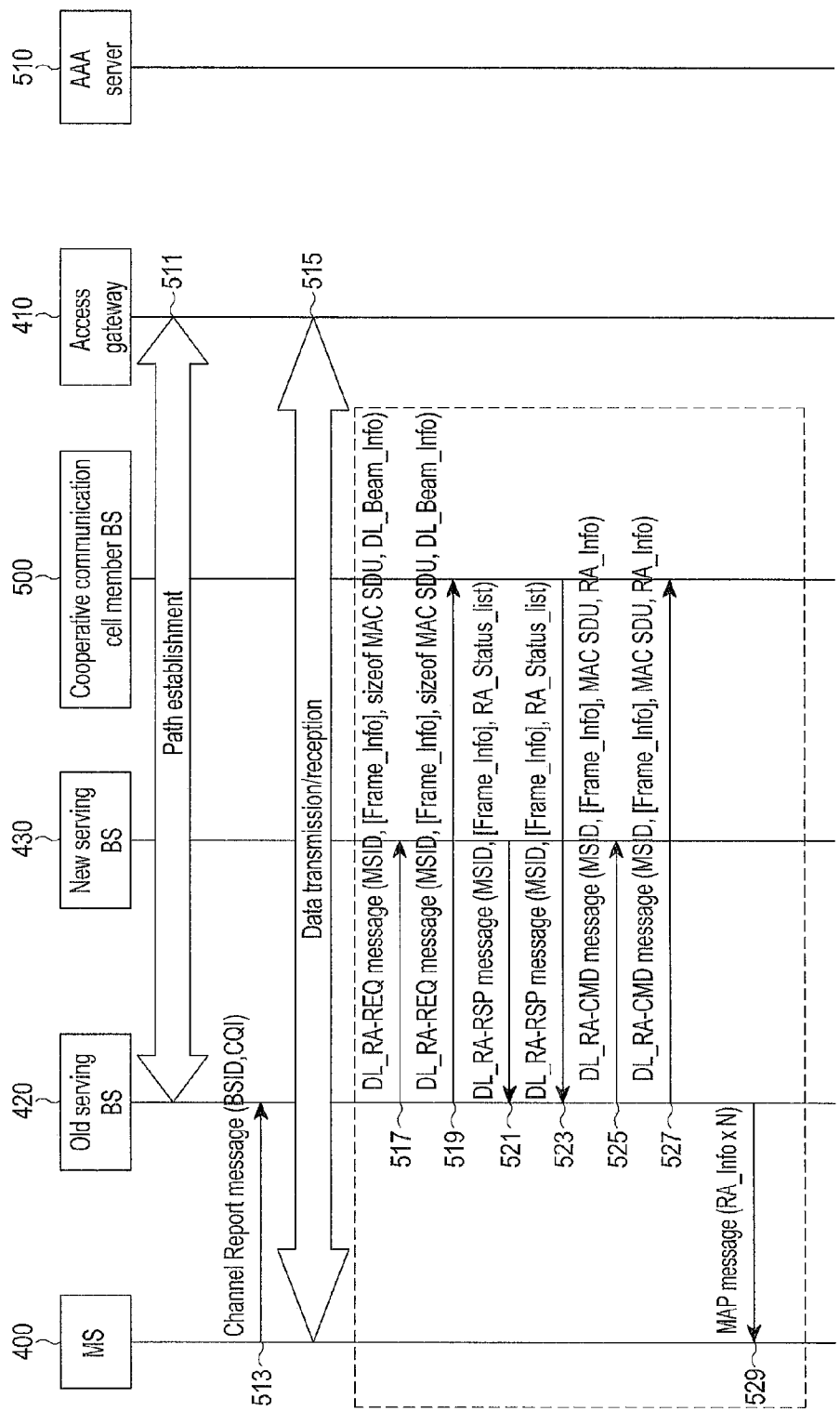
FIGS. 5A to 5C schematically illustrate a process for performing a data scheduling operation which is performed between an old serving BS and a new serving BS according to serving BS change in FIGS. 4A to 4B.
Figure 5B:
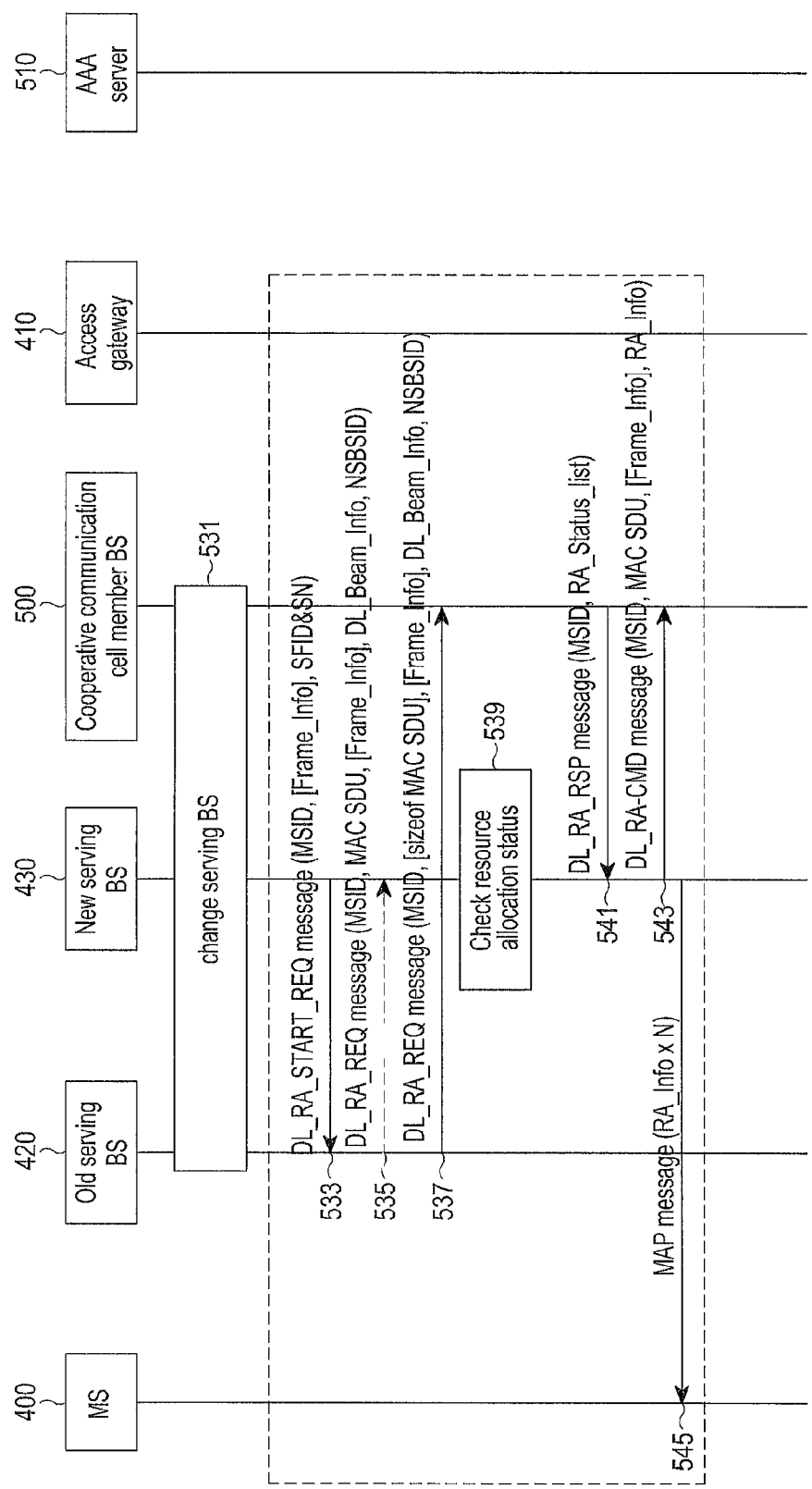
Figure 5C:
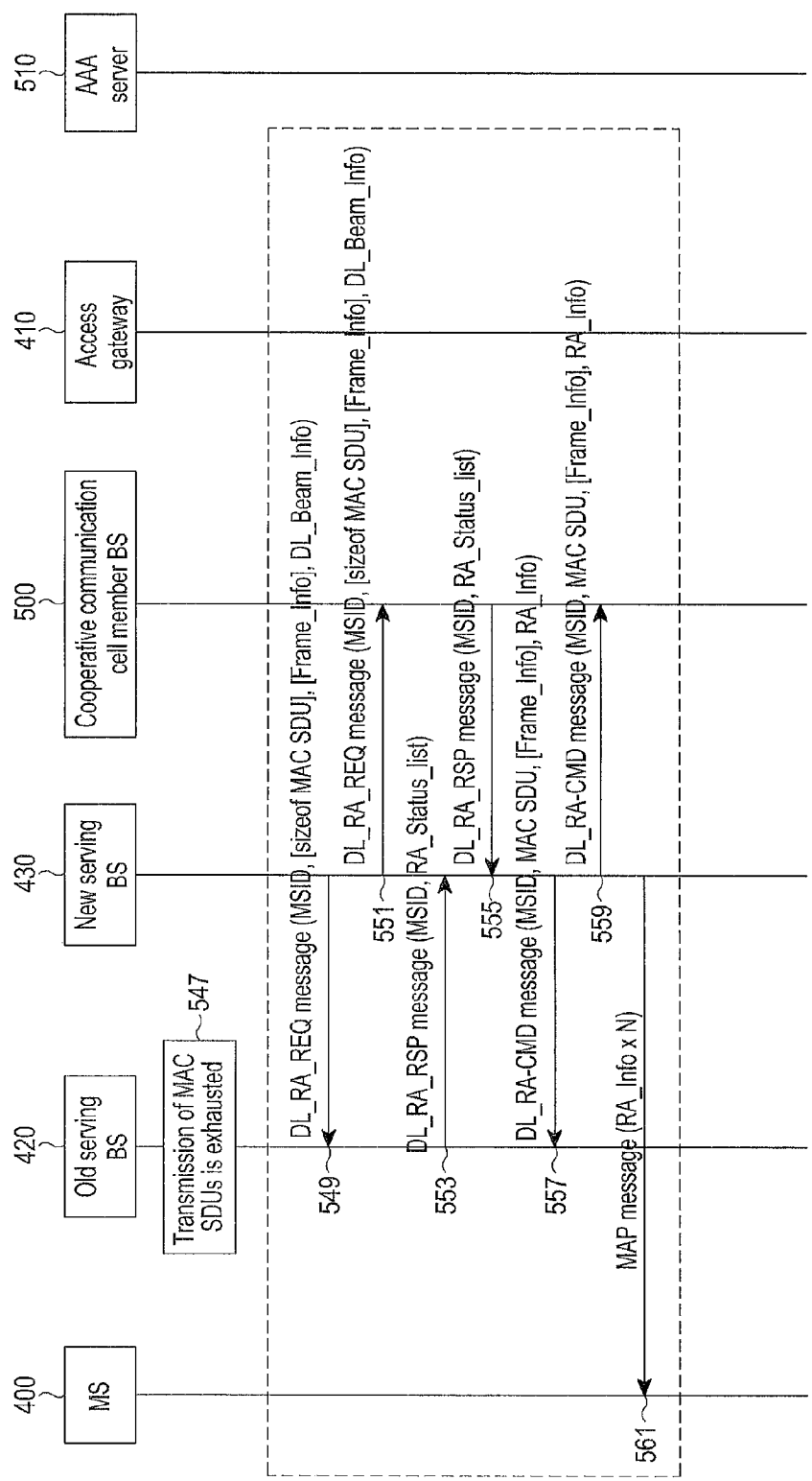

FIGS. 5A to 5C schematically illustrate a process for performing a data scheduling operation which is performed between an old serving BS and a new serving BS according to serving BS change in FIGS. 4A to 4B.

Referring to FIGS. 5A to 5C, a path has been established between an old serving BS 420 and an access gateway 410 in operation 511. The MS 400 reports a measurement result for a reference signal received from each of neighbor BSs to the old serving BS 420 using a channel report message in operation 513. Data transmission/reception is performing between the MS 400 and the access gateway 410 in operation 515.

An Inter-BS scheduling operation performed by the old serving BS 420 before a serving BS is changed will be described with reference to operations 517 to 529.

The old serving BS 420 determines to transmit data to the MS 400 through the new serving BS 430 and a cooperative communication cell member BS 500 among cooperative communication cell member BSs within a cooperative communication cell based on the measurement result included in the channel report message received from the MS 400, so the old serving BS 420 transmits a DL resource allocation request (DL_RA-REQ) message to related BSs, i.e., the new serving BS 430 and the cooperative communication cell member BS 500 in operations 517 and 519. Here, it will be noted that a serving BS is not yet changed, so the new serving BS 430 has a name 'serving BS', however the new serving BS 430 can operate as a cooperative communication cell member BS, not a serving BS.

Even if each of the new serving BS 430 and the cooperative communication cell member BS 500 operate as a cooperative communication cell member BS for the MS 400, each of the new serving BS 430 and the cooperative communication cell member BS 500 can operate as a serving BS for other MSs (not shown in FIGS. 5A to 5B), so each of the new serving BS 430 and the cooperative communication cell member BS 500 has capability for allocating resources to the other MSs. The old serving BS 420 transmits a DL_RA-REQ message to each of the new serving BS 430 and the cooperative communication cell member BS 500 in order to detect resource status for each of the new serving BS 430 and the cooperative communication cell member BS 500, i.e., in order to detect available resource among resources which the new serving BS 430 and the cooperative communication cell member BS 500 schedule.

The DL_RA-REQ message includes an MSID, a Frame_Info, a size of MAC SDU, and a DL_Beam_Info. The size of MAC SDU is a parameter representing a size of a related MAC SDU, the Frame_Info is a parameter representing information on a frame on which a related MAC SDU is transmitted, and the DL_Beam_Info is a parameter representing information on a DL beam which each cooperative communication cell member BS should use on transmitting data if the cooperative communication system uses a beamforming scheme. The Frame_Info is a parameter which is optionally inserted, and can be included into the DL_RA-REQ message as necessary. The Frame_Info is an omittable parameter, so it will be noted that the Frame_Info is shown by a bracket in FIGS. 5A to 5C. The Frame_Info is omittable if a data scheduling timing point is predetermined. For example, if the DL_RA-REQ message is transmitted on a frame # n and data scheduling is performed on a frame #n+3, the Frame_Info is omittable.

After receiving the DL_RA-REQ message from the old serving BS 420, each of the new serving BS 430 and the cooperative communication cell member BS 500 includes information on a candidate resource region through which each of the new serving BS 430 and the cooperative communication cell member BS 500 can transmit a MAC SDU corresponding to the size of MAC SDU into a DL resource allocation response (DL_RA-RSP) message as a response message to the DL_RA-REQ message by determining resource allocation status, and transmits the DL_RA-RSP message to the old serving BS 420 in operations 521 and 523. The DL_RA-RSP message includes an MSID, a Frame_Info, and a RA_Status_list. The RA_Status_list includes information on a candidate resource region through which a MAC SDU corresponding to a size of MAC SDU can be transmitted, i.e., a region ID of the candidate resource region. The Frame_Info can be included into the DL_RA-RSP message as necessary.

After receiving the DL_RA-RSP message from each of the new serving BS 430 and the cooperative communication cell member BS 500, the old serving BS 420 determines a resource region to be used for transmitting data in each of the new serving BS 430 and the cooperative communication member BS 500 based on the RA_Status_list included in the DL_RA-RSP message. The old serving BS 420 transmits a DL resource allocation command (DL_RA-CMD) message including RA_Info as information on the determined resource region to each of the new serving BS 430 and the cooperative communication cell member BS 500 in operations 525 and 527. In FIGS. 5A to 5C, the old serving BS 420 transmits the DL_RA-CMD message to each of the new serving BS 430 and the cooperative communication cell member BS 500, however, it will be understood by those of ordinary skill in the art that the old serving BS 420 can transmit the DL_RA-CMD message to one of the new serving BS 430 and the cooperative communication cell member BS 500, or may not transmit the DL_RA-CMD message to all of the new serving BS 430 and the cooperative communication cell member BS 500. That is, the old serving BS 420 does not the DL_RA-CMD message to all BSs which join a negotiation for a cooperative communication, and does transmit the DL_RA-CMD message to only a necessary BS according to a situation of the cooperative communication system. For example, the old serving BS 420 may not involve a BS which has load greater than or equal to preset threshold load in data transmission for the MS 400 by considering load balancing. The threshold load can be appropriately set according to the situation of the cooperative communication system, and the detailed description of the threshold load will be omitted. In order for the old serving BS 420 to consider the load balancing, load status information for a related BS should be included into the DL_RA_RSP message.

The old serving BS 420 transmits, to the MS 400, a MAP message including RA_Info as information on a resource region which is allocated to the MS 400 in each of the new serving BS 430 and the cooperative communication cell member BS 500 in operation 529.

In the Inter-BS scheduling operation in operations 517 to 529, the old serving BS 420 provides the size of MAC SDU, and related cooperative communication cell member BSs provide information on the resource region which is determined according to the size of MAC SDU to the old serving BS 420. However, it will be understood by those of ordinary skill in the art that the old serving BS 420 does not provide the size of MAC SDU, related cooperative communication cell member BSs provide resource allocation status information indicating which resource region is used and which resource region is idle to the old serving BS 420, so the old serving BS 420 can determine a resource region which related cooperative communication cell member BSs will allocate for the MS 400. Here, the resource allocation status information can be periodically provided.

If a serving BS change operation is performed while the old serving BS 420 transmits data to the MS 400 through the Inter-BS scheduling operation in operation 531, that is, if the old serving BS 420 transmits the CC_Update_Announce message to the new serving BS 430, a control right for the MS 400 is transferred from the old serving BS 420 to the new serving BS 430. In this case, the MAC SDU buffered in the buffer of the old serving BS 420 is not forwarded to the new serving BS 430. The new serving BS 430 can know quantity of MAC SDUs for the MS 400 buffered in the old serving BS 420. So, the new serving BS 430 should perform a data scheduling operation for the MAC SDUs buffered in the buffer of the old serving BS 420.

So, the new serving BS 430 transmits a DL resource allocation start request (DL_RA_START_REQ) message to the old serving BS 420 in order to command the old serving BS 420 to perform an Inter-BS scheduling operation with the new serving BS 430 in operation 533. The DL_RA_START_REQ message includes an MSID, a Frame_Info, and an SFID&SN. The SFID is a parameter representing a service flow ID, and the SN is a parameter representing a sequence number (SN) for indicating a MAC SDU to be processed in a service flow mapping to the SFID. The Frame_Info can be included into the DL_RA_START_REQ message, or may not be included into the DL_RA_START_REQ message as necessary.

An operation after operation 533 is similar to an Inter-BS scheduling operation performed before a serving BS is changed, so only a difference from the Inter-BS scheduling operation performed before the serving BS is changed will be described below.

After receiving the DL_RA_START_REQ message from the new serving BS 430, the old serving BS 420 transmits a DL_RA_REQ message to each of the new serving BS 430 and the cooperative communication cell member BS 500 like a situation before serving BS change (operations 535 and 537). A difference between the DL_RA_REQ message transmitted to the each of the new serving BS 430 and the cooperative communication cell member BS 500 before the serving BS change and the DL_RA_REQ message transmitted to the each of the new serving BS 430 and the cooperative communication cell member BS 500 after the serving BS change depends on whether the DL_RA_REQ message includes information on a new serving BS to which cooperative communication cell member BSs should transmit a DL_RA_RSP message, i.e., a new serving BSID (NSBSID).

The DL_RA_REQ message transmitted from the old serving BS 420 to the new serving BS 430 includes a MAC SDU which will be transmitted to the MS 400 instead of a size of MAC SDU unlike the DL_RA_REQ message transmitted from the old serving BS 420 to the cooperative communication cell member BS 500. Here, the new serving BS 430 includes the MAC SDU which will be transmitted to the MS 400 into the DL_RA_REQ message in order to facilitate transmission of a practical MAC SDU to appropriate cooperative communication cell member BSs if the new serving BS 430 transmits a DL_RA_CMD message to the appropriate cooperative communication cell member BSs.

Since the new serving BS 430 knows that the new serving BS 430 is a serving BS and resource allocation information for other cooperative communication cell member BSs will be received, the new serving BS 430 checks resource allocation status without transmitting a message in operation 539. The cooperative communication cell member BS 500 transmits a DL_RA_RSP message to a BS corresponding to the NSBSID included in the DL_RA_REQ message, i.e., the new serving BS 430 in operation 541. That is, the cooperative communication cell member BS 500 transmits the DL_RA_RSP message to the new serving BS 430 not the old serving BS 420 which transmits the DL_RA-REQ message. An operation corresponding to operations 543 to 555 in FIGS. 5A to 5B is equal to an operation performed in the Inter-BS scheduling operation before the serving BS change, so the detailed description will be omitted.

The new serving BS 430 transmits a DL_RA_CMD message corresponding to resource allocation information of the new serving BS 430 and resource allocation information of cooperative communication cell member BSs, i.e., the old serving BS 420 and the cooperative communication cell member BS 500 to each of the old serving BS 420 and the cooperative communication cell member BS 500 in operations 557 and 559.

The new serving BS 430 transmits a MAP message including RA_Info as information on a resource region which is allocated to the MS 400 in the each of the old serving BS 420 and the cooperative communication cell member BS 500 in operation 561.

As described above, the Inter-BS scheduling operation after the serving BS change is implemented by a scheme in which scheduling for MAC SDUs buffered in the new serving BS 430 starts after MAC SDUs for the MS 400 buffered in the old serving BS 420 are exhausted according to data scheduling of the new serving BS 430.

The old serving BS 420 does not have to become always a cooperative communication cell member BS for the MS 400. That is, it is determined whether the old serving BS 420 will become the cooperative communication cell member BS for the MS 400 corresponding to a measurement result for a reference signal of the MS 400. In a case that the new serving BS 430 may not determine whether the old serving BS 420 will become the cooperative communication cell member BS for the MS 400 using the measurement result, even if the old serving BS 420 may not become the cooperative communication cell member BS for the MS 400, the new serving BS 430 can control the old serving BS 420 through a front haul link. So, the old serving BS 420 can keep its own status as the cooperative communication cell member BS for the MS 400, due to the need of the new serving BS 430. The cooperative communication cell member BS denotes a BS which transmits data to the MS and receives data from the MS with the new serving BS 430 through air according to data scheduling of the new serving BS 430. If it is impossible that the old serving BS 420 transmits data to the MS 400 and receives data from the MS 400 with the new serving BS 430, the old serving BS 420 may not become the cooperative communication cell member BS for the MS 400. Even if it is impossible that the old serving BS 420 transmits data to the MS and receives data from the MS 400 with the new serving BS 430 through the air, the old serving BS 420 can become the cooperative communication cell member BS for the MS 400 if the new serving BS 430 can involve the old serving BS 420 in data transmission and/or reception for the MS 400 through the front haul link. That is, even if the old serving BS 420 may not transmit data to the MS 400 and receive data from the MS 400 through the air, the old serving BS 420 can become the cooperative communication cell member BS for the MS 400.

In order to prevent a case that the old serving BS 420 which may not transmit data to the MS 400 and receive data from the MS 400 through the air becomes the cooperative communication cell member BS for the MS 400, the old serving BS 420 may not operate as the cooperative communication cell member BS for the MS 400 if a BSID of the old serving BS 420 is not included in the CC_Update_Announce message and the old serving BS 420 receives a CC_Release message.

Although FIGS. 5A to 5C illustrate a process for performing a data scheduling operation which is performed between an old serving BS and a new serving BS according to serving BS change in FIGS. 4A to 4B, various changes could be made to FIGS. 5A to 5C. For example, although shown as a series of operations, various operations in FIGS. 5A to 5C could overlap, occur in parallel, occur in a different order, or occur multiple times.

A process for performing a data scheduling operation which is performed between an old serving BS and a new serving BS according to serving BS change in a cooperative communication system according to the second embodiment of the present disclosure has been described with reference to FIGS. 4A to 4B and 5A to 5C, and a process for performing a data scheduling operation which is performed between an old serving BS and a new serving BS according to serving BS change in a cooperative communication system according to an embodiment #2 of the present disclosure will be described with reference to FIGS. 6A to 6B and 7A to 7C.

Figure 6A:
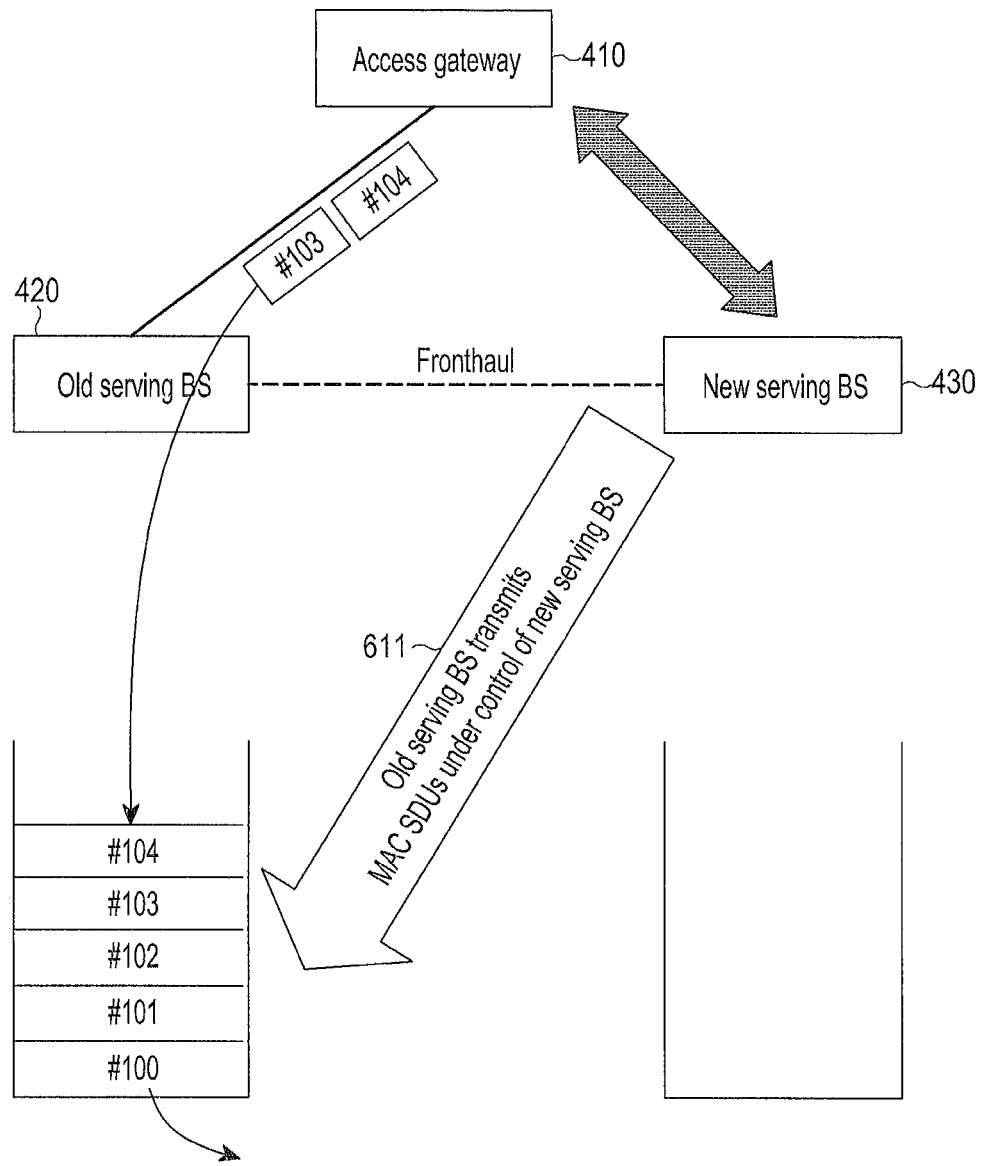
FIGS. 6A to 6B schematically illustrate a process for performing a data scheduling operation which is performed between an old serving BS and a new serving BS according to serving BS change in a cooperative communication system according to an embodiment #2 of the present disclosure.
Figure 6B:
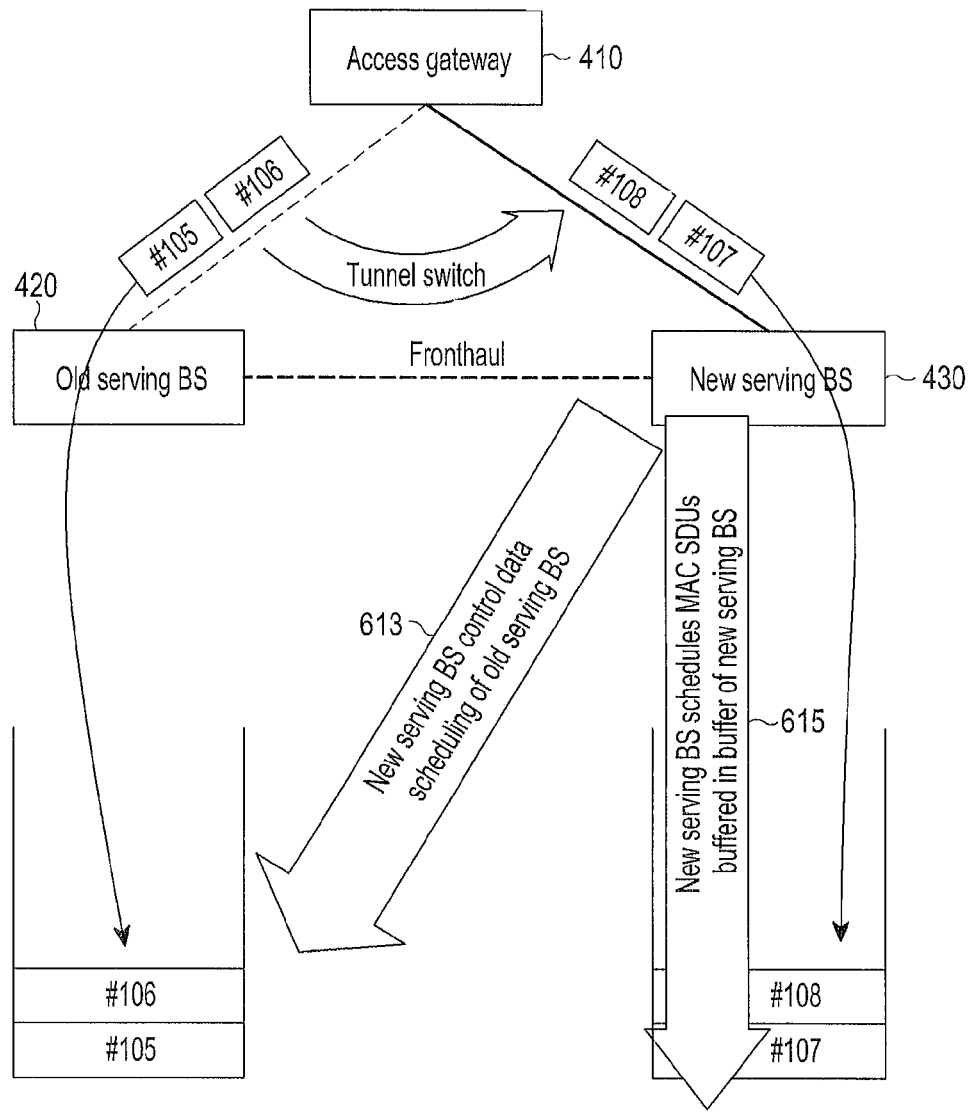

FIGS. 6A to 6B schematically illustrate a process for performing a data scheduling operation which is performed between an old serving BS and a new serving BS according to serving BS change in a cooperative communication system according to the second embodiment of the present disclosure.

Referring to FIGS. 6A to 6B, the cooperative communication system includes an MS 400, an access gateway 410, an old serving BS 420, and a new serving BS 430.

In the second embodiment of the present disclosure, unlike the first embodiment of the present disclosure, the old serving BS 420 continuously buffers MAC SDU received through the access gateway 410 in a buffer of the old serving BS 420 without forwarding the MAC SDU received through the access gateway 410 to the new serving BS 430 until a tunnel established between the access gateway 410 and the new serving BS 430 is activated.

So, a MAC SDU is transmitted to the MS 400 through the old serving BS 420 according to a control operation between the old serving BS 420 and the new serving BS 430 until the tunnel established between the access gateway 410 and the new serving BS 430 is activated (operation 611).

In FIG. 6A, a MAC SDU#100 to a MAC SDU#102 indicate MAC SDUs buffered in the buffer of the old serving BS 420 before the serving BS is changed, and a MAC SDU #103 to a MAC SDU #104 indicate MAC SDUs which are transmitted from the access gateway 410 to the old serving BS 420 after the serving BS is changed and transmitted to the MS 400 according to a scheduling of the new serving BS 430.

If the tunnel established between the access gateway 410 and the new serving BS 430 is activated, the old serving BS 420 may not receive a MAC SDU for the MS 400 from the access gateway 410, so the new serving BS 430 continuously controls data scheduling of the old serving BS 420 in operation 613. Finally, if transmission for all MAC SDUs buffered in the buffer of the old serving BS 420 is exhausted after the tunnel established between the access gateway 410 and the new serving BS 430 is activated, the new serving BS 430 performs a scheduling operation for MAC SDUs buffered in the buffer of the new serving BS 430 in operation 615.

In FIG. 6B, a MAC SDU#105 to a MAC SDU#106 indicate MAC SDUs which the old serving BS 420 receives from the access gateway 410 before the tunnel established between the new serving BS 430 and the access gateway 410 after the serving BS is changed. A MAC SDU #107 and a MAC SDU #108 indicate MAC SDUs which the new serving BS 430 receives from the access gateway 410 through an activated tunnel between the new serving BS 430 and the access gateway 410.

As described in FIGS. 6A to 6B, in a cooperative communication system, even if an old serving BS does not forward all data to a new serving BS when a serving BS is changed, the new serving BS can prevent unnecessary latency by performing an Inter-BS scheduling operation.

A process for performing a data scheduling operation which is performed between an old serving BS and a new serving BS according to serving BS change in a cooperative communication system according to the second embodiment of the present disclosure has been described with reference to FIGS. 6A to 6B, and a process for performing a data scheduling operation which is performed between an old serving BS and a new serving BS according to serving BS change in FIGS. 6A to 6B will be described with reference to FIGS. 7A to 7C.

Figure 7A:
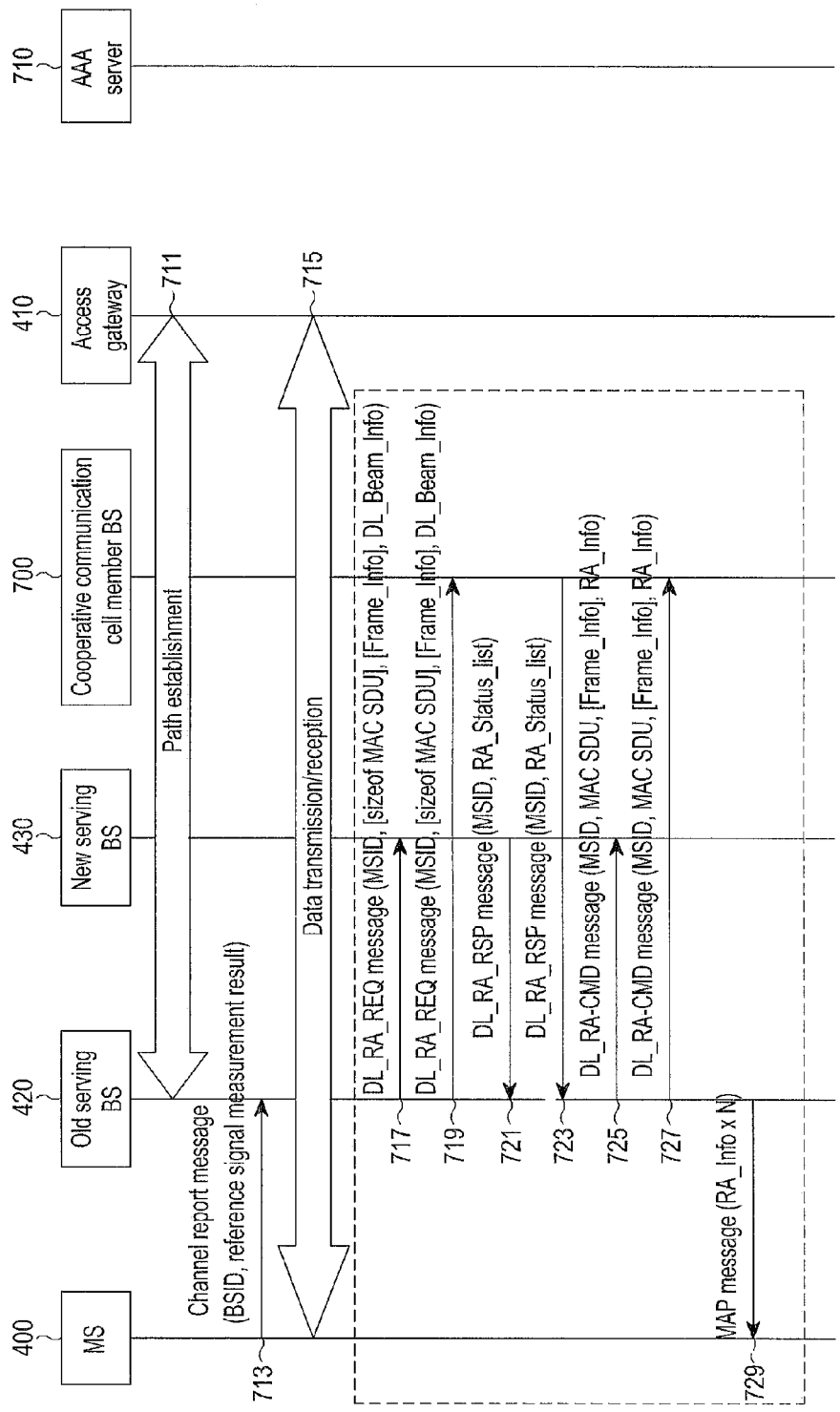
FIGS. 7A to 7C schematically illustrate a process for performing a data scheduling operation which is performed between an old serving BS and a new serving BS according to serving BS change in FIGS. 6A to 6B.
Figure 7B:
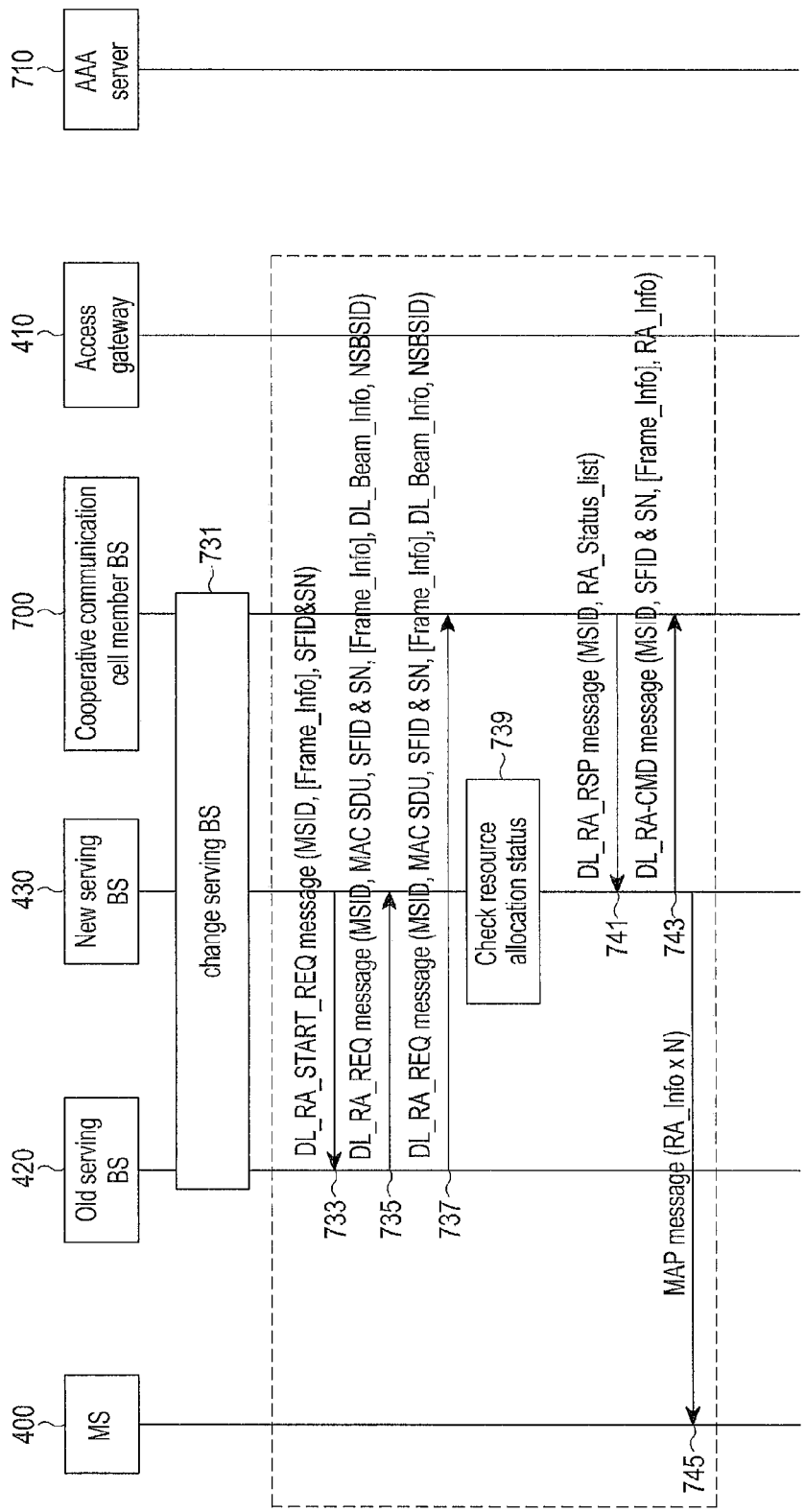
Figure 7C:
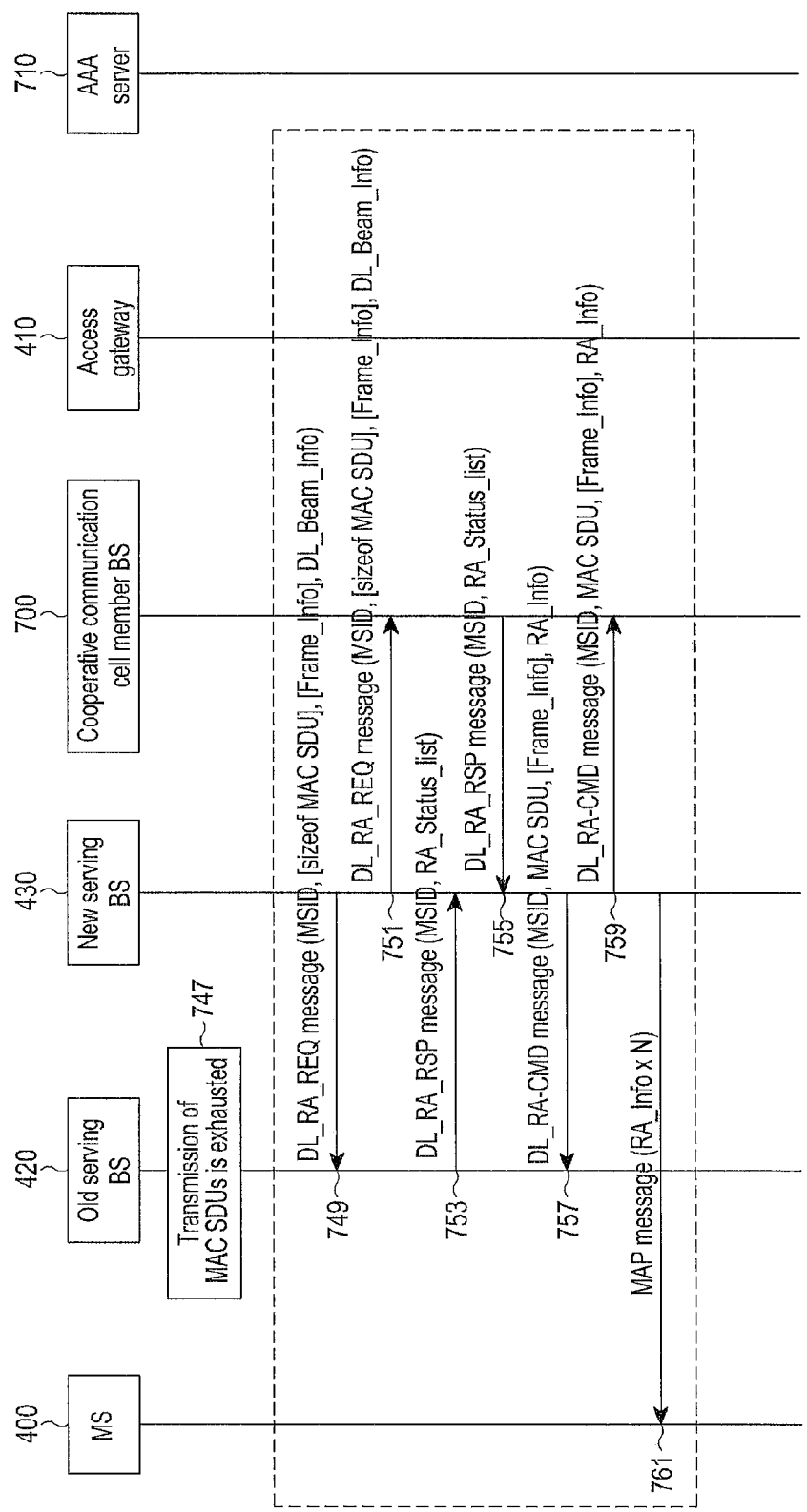

FIGS. 7A to 7C schematically illustrate a process for performing a data scheduling operation which is performed between an old serving BS and a new serving BS according to serving BS change in FIGS. 6A to 6B.

Prior to a description of FIGS. 7A to 7C, it will be noted that an operation corresponding to the operations except for operations 735, 737, and 743 in FIGS. 7A to 7C is equal to an operation in FIGS. 5A to 5C, so the detailed description will be omitted. That is, operations 511 to 533 in FIGS. 5A to 5C are equal to operations 711 to 733 in FIGS. 7A to 7C, operations 539 to 541, and 545 to 561 in FIGS. 5A to 5C are equal to operations 739 to 741, and 745 to 761 in FIGS. 7A to 7C, so the detailed description will be omitted.

Referring to FIGS. 7A to 7C, if a serving BS is changed, an old serving BS 420 transmits a DL_RA-REQ message including a MAC SDU and an SFID&SN indicating a related MAC SDU to a new serving BS 430 and a cooperative communication cell member BS 700 in operations 735 and 737.

If the new serving BS 430 transmits a DL_RA_CMD message to related cooperative communication cell member BSs in order to select a cooperative communication cell member BS which will join data transmission for the MS 400, the DL_RA_CMD message includes only an SFID&SN indicating a related MAC SDU in operation 743. In FIGS. 7A to 7C, the related MAC SDU, the DL_RA_CMD message includes the SFID&SN, however, it will be understood by those of ordinary skill in the art that other parameter, not the SFID&SN can be included into the DL_RA_CMD message in order for the new serving BS 430 to indicated the related MAC SDU. Since a MAC SDU has been transmitted through a DL_RA-REQ message, the DL_RA_CMD can include only the SFID&SN.

The process for performing the data scheduling operation in FIGS. 7A to 7C can be applied to an embodiment #1 of the present disclosure as well as the second embodiment of the present disclosure. The reason is why an old serving BS can transmit a DL-RA-REQ message including a MAC SDU to a new serving BS and the new serving BS can process the MAC SDU using an SFID&SN.

Although FIGS. 7A to 7C illustrate a process for performing a data scheduling operation which is performed between an old serving BS and a new serving BS according to serving BS change in FIGS. 6A to 6B, various changes could be made to FIGS. 7A to 7C. For example, although shown as a series of operations, various operations in FIGS. 7A to 7C could overlap, occur in parallel, occur in a different order, or occur multiple times.

In a view of a serving BS, an arbitrary cooperative communication cell member BS can be a cooperative communication cell member BS which other serving BS different from the serving BS manages. So, an operation process in a case that a cooperative communication cell member BS which a serving BS #1 manages is a cooperative communication cell member BS which a serving BS #2 manages in a cooperative communication system according to an embodiment of the present disclosure will be described with reference to FIG. 8.

Figure 8:
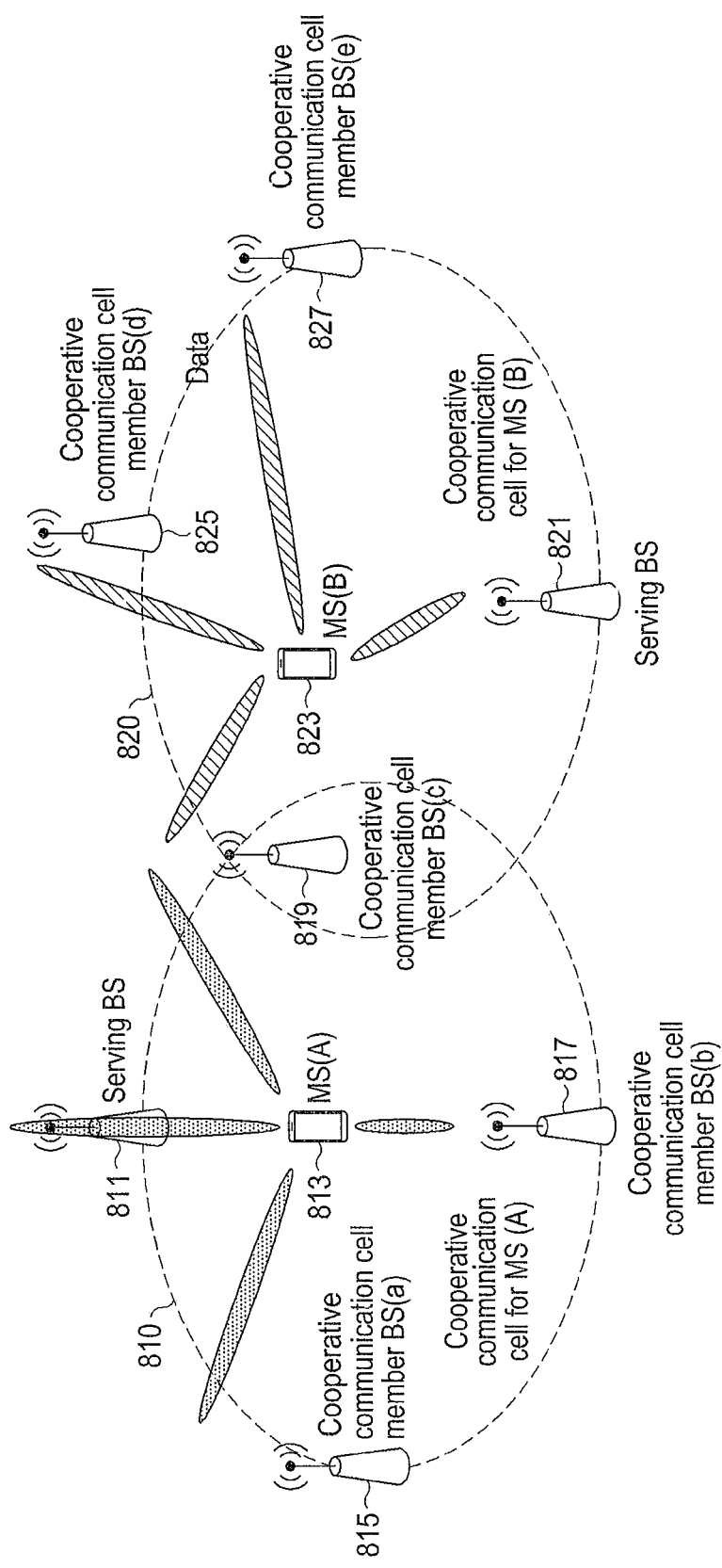
FIG. 8 schematically illustrates an operation process in a case that a cooperative communication cell member BS which a serving BS #1 manages is a cooperative communication cell member BS which a serving BS #2 manages in a cooperative communication system according to an embodiment of the present disclosure.

FIG. 8 schematically illustrates an operation process in a case that a cooperative communication cell member BS which a serving BS #1 manages is a cooperative communication cell member BS which a serving BS #2 manages in a cooperative communication system according to an embodiment of the present disclosure.

Referring to FIG. 8, the cooperative communication system includes a cooperative communication cell 810 for an MS (A) 813 and a cooperative communication cell 820 for an MS (B) 823. The cooperative communication cell 810 includes a serving BS 811, the MS (A) 813, a cooperative communication cell member BS (a) 815, a cooperative communication cell member BS (b) 817, and a cooperative communication cell member BS (c) 819. The cooperative communication cell 820 includes a cooperative communication cell member BS (c) 819, a serving BS 821, the MS (B) 823, a cooperative communication cell member BS (d) 825, and a cooperative communication cell member BS (e) 827.

As described in FIG. 8, the cooperative communication cell member BS (c) 819 operates as a cooperative communication cell member BS for two cooperative communication cells, i.e., the cooperative communication cell 810 and the cooperative communication cell 820. That is, the cooperative communication cell member BS (c) 819 exchanges scheduling information with a related serving BS, and joins a scheduling operation for the MS (A) 813 and the MS (B) 823.

If a serving BS in each cooperative communication cell tries to transmit data for each of the MS (A) 813 and the MS (B) 823 on the same frame, the serving BS in each cooperative communication cell can simultaneously a DL_RA-REQ message to the cooperative communication cell member BS (c) 819. After receiving the DL_RA-REQ message from the serving BS 811 and the serving BS 821, the cooperative communication cell member BS (c) 819 transmits a DL_RA-RSP message including a RA_Status_list (denotes information on a candidate resource region at which a MAC PDU corresponding to a size of MAC PDU can be transmitted) in response to the DL_RA-REQ message to the serving BS 811 and the serving BS 821.

After receiving the DL_RA-RSP message from the cooperative communication cell member BS (c) 819, the serving BS 811 and the serving BS 821 can transmit a DL-RA-CMD message indicating that the serving BS 811 and the serving BS 821 will allocate the same resource among available resources which the cooperative communication cell member BS (c) 819 proposes to the cooperative communication cell member BS (c) 819. The serving BS 811 and the serving BS 821 can allocate the same resource to notify to the cooperative communication cell member BS (c) 819 that the serving BS 811 and the serving BS 821 will provide a service. In this case, a resource collision can occur due to allocation of the same resource.

An example of a resource collision situation which can occur in a case that a plurality of serving BSs allocate the same resource to one cooperative communication cell member BS in a cooperative communication system according to an embodiment of the present disclosure will be described with reference to FIG. 9.

Figure 9:
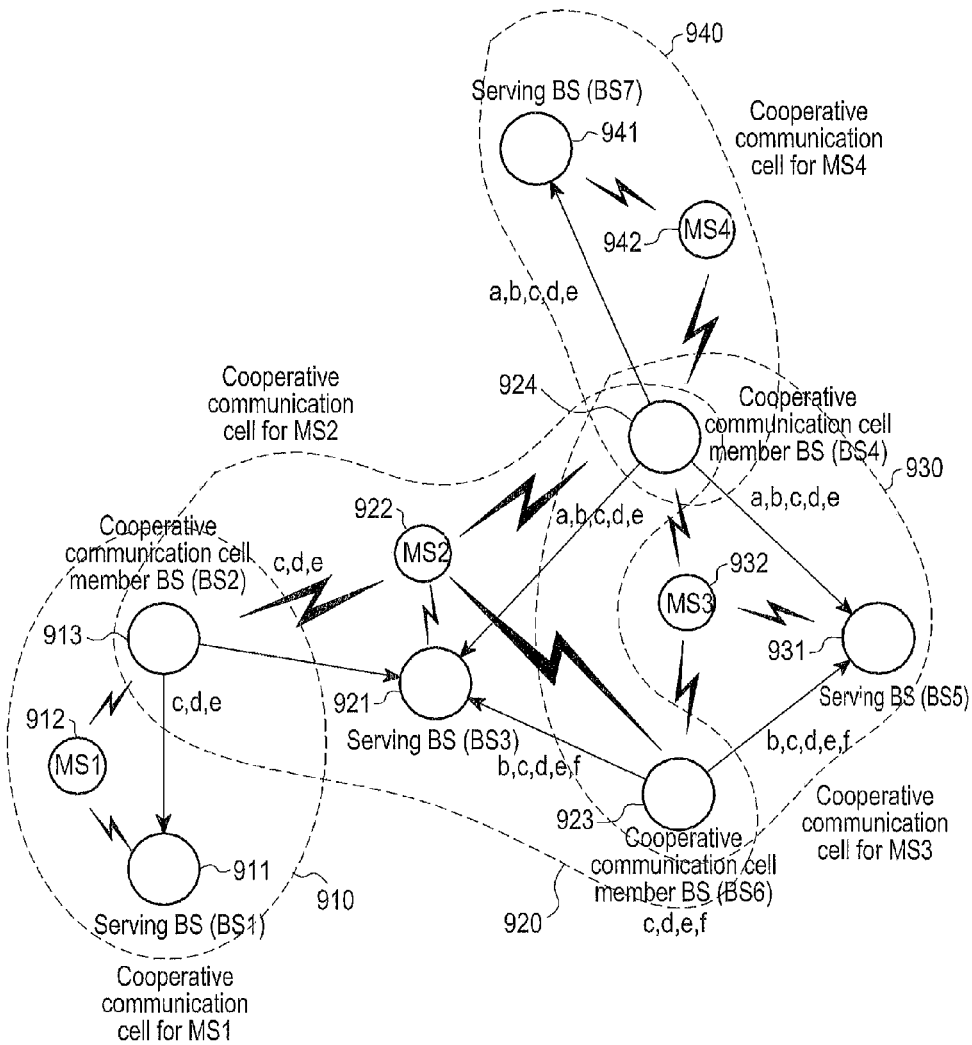
FIG. 9 schematically illustrates an example of a resource collision situation which may occur in a case that a plurality of serving BSs allocate the same resource to one cooperative communication cell member BS in a cooperative communication system according to an embodiment of the present disclosure.

FIG. 9 schematically illustrates an example of a resource collision situation which can occur in a case that a plurality of serving BSs allocate the same resource to one cooperative communication cell member BS in a cooperative communication system according to an embodiment of the present disclosure.

Referring to FIG. 9, the cooperative communication system includes total four cooperative communication cells, i.e., a cooperative communication cell 910 for an MS1 912, a cooperative communication cell 920 for an MS2 922, a cooperative communication cell 930 for an MS3 932, and a cooperative communication cell 940 for an MS4 942. The cooperative communication cell 910 includes a serving BS1 911, an MS1 912, and a cooperative communication cell member BS2 913. The cooperative communication cell 920 includes a serving BS3 921, an MS2 922, and the cooperative communication cell member BS2 913, a cooperative communication cell member BS6 923, and a cooperative communication cell member BS4 924. The cooperative communication cell 930 includes a serving BS5 931, an MS3 932, the cooperative communication cell member BS6 923, and the cooperative communication cell member BS4 924. The cooperative communication cell 940 includes a serving BS BS7 941, an MS4 942, and the cooperative communication cell member BS4 924.

As described in FIG. 9, it will be understood that the cooperative communication cell member BS2 913, the cooperative communication cell member BS4 924, and the cooperative communication cell member BS6 923 operate as a cooperative communication cell member BS in two cooperative communication cells. So, if two cooperative communication cells allocate the same resource to each of the cooperative communication cell member BS2 913, the cooperative communication cell member BS4 924, and the cooperative communication cell member BS6 923, a resource collision situation can occur (950).

An example of a resource collision situation which can occur in a case that a plurality of serving BSs allocate the same resource to one cooperative communication cell member BS in a cooperative communication system according to an embodiment of the present disclosure has been described with reference to FIG. 9, and a relationship among frames on a front haul and frames on air interface (I/F) in a resource collision situation in FIG. 9 will be described with reference to FIG. 10.

Figure 10:
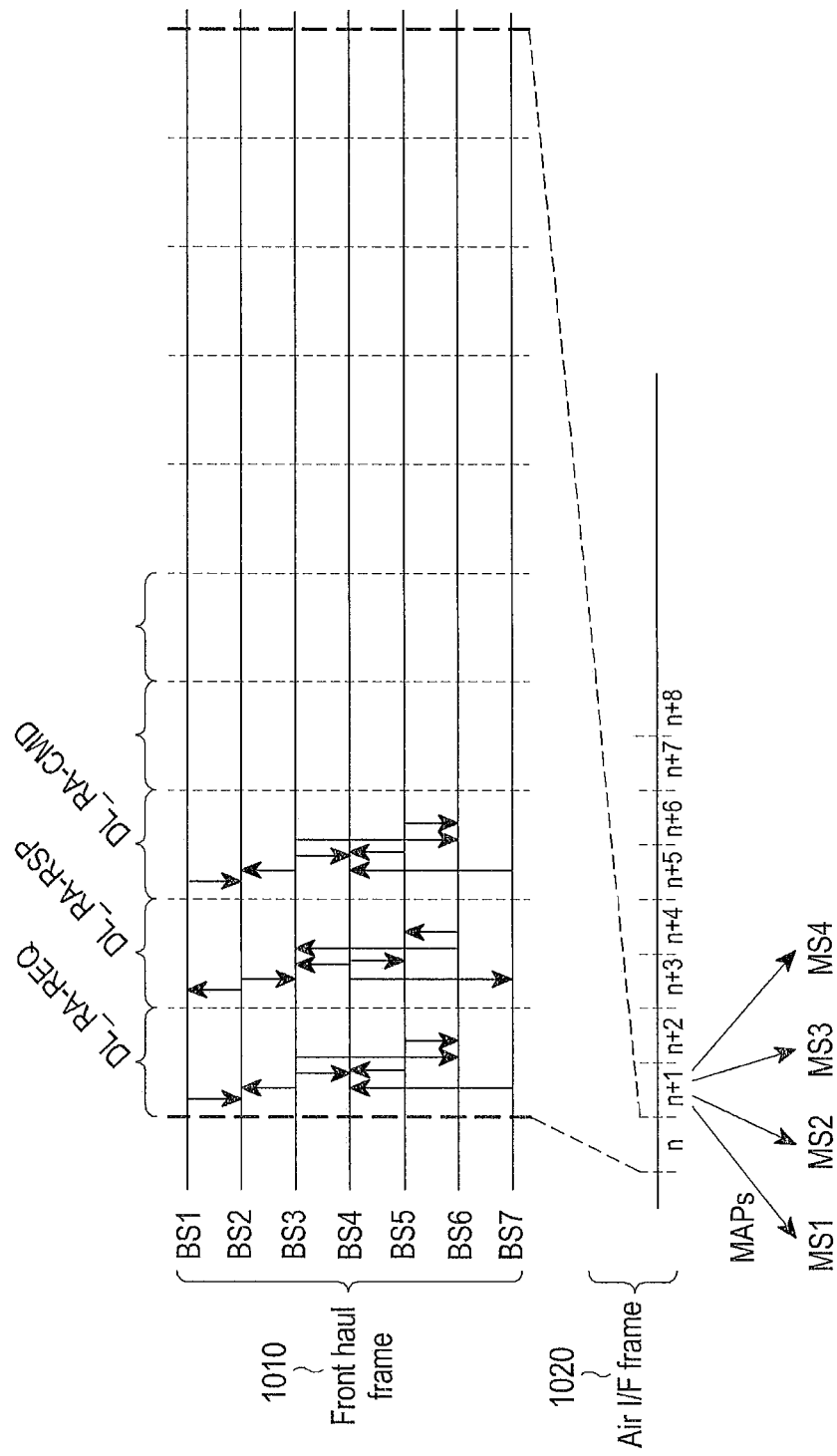
FIG. 10 schematically illustrates a relationship among frames on a front haul and frames on air I/F in a resource collision situation in FIG. 9.

FIG. 10 schematically illustrates a relationship among frames on a front haul and frames on air I/F in a resource collision situation in FIG. 9.

Referring to FIG. 10, a link among BSs is basically generated in a form of a front haul (1010), and is separately generated from an air I/F between an MS and a BS (1020).

For frame-by-frame scheduling for an MS, an inter-BS cooperative communication is performed. In one frame, for scheduling for an MS, a resource negotiation among BSs is performed through a front haul. Since the resource negotiation should be completed prior to a frame of an air interface on the front haul, a frame length on the front haul is shorter than a frame length on the air interface. For example, for scheduling on a frame N+1, a resource negotiation is performed within a frame N.

On the front haul frame, serving BSs in each cooperative communication cell transmit a DL_RA-REQ message to cooperative communication cell member BSs. After receiving the DL_RA-REQ message, the cooperative communication cell member BSs notifies a related serving BS of an available resource list indicating an available resource of the cooperative communication cell member BSs through a DL_RA-RSP message. Based on this, the related serving BS notifies information on a resource which a related cooperative communication cell member BS will use in a cooperative communication cell through a DL_RA-CMD message.

In the aforementioned process, information on how a resource among cooperative communication cells/serving BSs is allocated is not shared, so a resource allocation collision occurs.

In FIG. 9, if serving BSs 911, 921, and 931 in each cooperative communication cell try to perform a DL-RA-REQ/RSP/CMD transaction with cooperative communication cell member BSs which belong to a cooperative communication cell for scheduling the MS1 912, the MS2 922, the MS3 932, and the MS4 942 on a specific, the same frame, the cooperative communication cell member BSs 913, 924, and 923 report information on an available resource at a related timing point to a related serving BS. For example, the cooperative communication cell member BS 913 reports to the serving BS 911 and the serving BS 921 that available resources are c, d, and e, and the cooperative communication cell member BS 924 reports to the serving BS 921, the serving BS 931, and the serving BS 941 that available resources are a, b, c, d, and e, and the cooperative communication cell member BS 923 reports to the serving BS 921 and the serving BS 931 that available resources are c, d, e, and f.

Like this, upon receiving information on available resources from a related cooperative communication cell member BS, the serving BS 911 knows that available resources c, d, and e can be allocated to the MS1 912, the serving BS 921 knows that available resources c, d, and e can be allocated to the MS2 922, the serving BS 931 knows that available resources c, d, and e can be allocated to the MS3 932, and the serving BS 941 knows that available resources a, b, c, d, and e can be allocated to the MS4 942.

Each serving BS detects an available resource which overlaps with the detected available resource, i.e., an available resource which each serving BS can use among available resources of each serving BS and selects an appropriate available resource among the selected available resources. In this case, serving BSs can request a cooperative communication cell member BS to use the same resource. That is, the serving BS 911 and the serving BS 921 can request the cooperative communication cell member BS 913 to use the same resource c. Due to this, it can be difficult for the cooperative communication cell member BS 913 to determine to use a related resource for which MS. This resource collision situation is one of situations which should be removed in a cooperative communication system. The resource collision situation occurs since it is impossible that each cooperative communication cell transmits/receives information on which resource will be used due to no link among serving BSs, so an embodiment of the present disclosure removes resource collision situation as the following.

(1) Resource Collision Avoidance Scheduling Embodiment #1

A BSID list of all serving BSs which try to request a resource on a related frame is included in a DL_RA-CMD message which a cooperative communication cell member BS transmits in response to a DL_RA-REQ message which a serving BS(s) transmits. After receiving the DL_RA-CMD message, a serving BS can detect which BSs (serving BSs) want to use the same resource through the cooperative communication cell member BS on a related frame.

Each of related serving BSs compares the BSID list with a BSID of each of the related serving BSs to allocate a resource based on an order of BSID. For example, in FIG. 9, a serving BS 921 receives information in Table 1.

TABLE 1

| cooperative communication cell member BS of serving BS 931 | available resource | serving BS (other than serving BS 931) |
|---|---|---|
| BS2 | c, d, e | BS1 |
| BS4 | a, b, c, d, e | BS5, BS7 |
| BS6 | b, c, d, e, f | BS5 |

Based on Table 1, if the serving BS 931 considers scheduling through all cooperative communication cell member BSs for cooperative communication cell member BSs 913, 924, and 923, the serving BS 931 can detect that common available resources c, d, and e are usable. The serving BS 931 detects that other serving BSs 911, 931, and 941 request an available resource for the cooperative communication cell member BSs 913, 924, and 923.

There can be various methods that serving BSs perform a scheduling operation. It will be assumed that serving BSs use a resource based on an order of BSID with an implicit method. Here, a serving BS1(BSID:1) detects that the serving BS1 (BSID:1) can use a resource c, a serving BS5(BSID:5) and a serving BS7(BSID:7) have BSIDs greater than a BSID of a serving BS3(BSID:3), so the serving BS3(BSID:3) detects that the serving BS3(BSID:3) can use a resource d, the serving BS5(BSID:5) detects that the serving BS5(BSID:5) can at least use a resource e, and the serving BS7(BSID:7) detects that the serving BS7(BSID:7) may not at least use resources c, d, and e (and may use resources a and b).

The serving BSs BS1, BS5, and BS7 will be described below.

TABLE 2

| cooperative communication cell member BS of serving BS1 | available resource | serving BS (other than serving BS1) |
|---|---|---|
| BS2 | c, d, e | BS3 |

The serving BS1 detects that the cooperative communication cell member BS2 (BSID: 2) can use resources c, d, and e. The serving BS1 can detect that other serving BS3 has requested a resource for a cooperative communication cell member BS2. The serving BS1 has a BSID less than a BSID of a serving BS3, so the serving BS1 detects that the serving BS1 can use a resource c and the serving BS (BS3) can at least use a resource d or a resource e.

TABLE 3

| cooperative communication cell member BS of serving BS5 | available resource | serving BS (other than serving BS5) |
|---|---|---|
| BS4 | a, b, c, d, e | BS3, BS7 |
| BS6 | c, d, e, f | BS3 |

The serving BS5 detects that the serving BS5 can use resources c, d, and e through the cooperative communication cell member BS4 (BSID: 4) and a cooperative communication cell member BS6 (BSID: 6). The serving BS5 can detect that other serving BS3 and serving BS 7 have requested a resource for a cooperative communication cell member BS4 and a cooperative communication cell member BS6. The serving BS5 has a BSID which is greater than the BSID of the serving BS3 and less than a BSID of the serving BS 7, so the serving BS5 detects that the serving BS3 can use the resource c and the serving BS7 can use the resource e.

TABLE 4

| cooperative communication cell member BS of serving BS7) | available resource | serving BS (other than serving BS7)) |
|---|---|---|
| BS4 | c, d, e | BS3, BS5 |

The serving BS7 detects that the serving BS7 can use resources a, b, c, d, and e through the cooperative communication cell member BS4 (BSID: 4). The serving BS7 can detect that other serving BS3 has requested a resource for the cooperative communication cell member BS4. The serving BS7 has a BSID which is greater than the BSID of the serving BS3 and a BSID of the serving BS 5, so the serving BS7 detects that the serving BS3 can use the resource a, the serving BS5 can use the resource b, and the serving BS7 can use the resource c.

So, an available resource of each serving BS can be summarized as Table 5.

TABLE 5

| Serving BS | available resource |
|---|---|
| BS1 | C |
| BS3 | D |
| BS5 | D |
| BS7 | C |

As illustrated in Table 5, each serving BS notifies related cooperative communication cell member BSs of information on a resource which each serving BS selects for each MS.

A relationship among frames on a front haul and frames on air I/F in a resource collision situation in FIG. 9 has been described with reference to FIG. 10, and another example of a resource collision situation which can occur in a case that a plurality of serving BSs allocate the same resource to one cooperative communication cell member BS in a cooperative communication system according to an embodiment of the present disclosure will be described with reference to FIG. 11.

Figure 11:
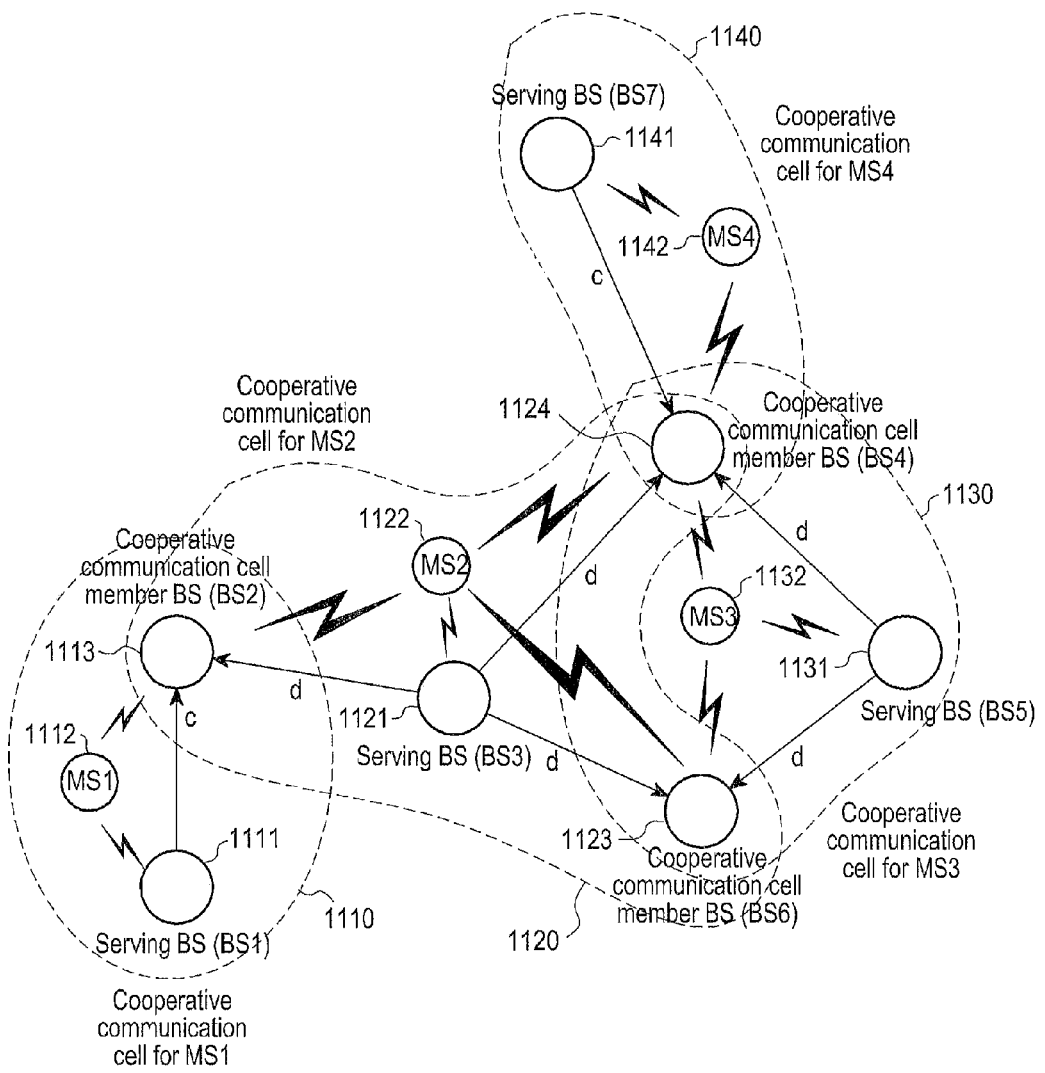
FIG. 11 schematically illustrates another example of a resource collision situation which may occur in a case that a plurality of serving BSs allocate the same resource to one cooperative communication cell member BS in a cooperative communication system according to an embodiment of the present disclosure.

FIG. 11 schematically illustrates another example of a resource collision situation which can occur in a case that a plurality of serving BSs allocate the same resource to one cooperative communication cell member BS in a cooperative communication system according to an embodiment of the present disclosure.

Referring to FIG. 11, the cooperative communication system includes total four cooperative communication cells, i.e., a cooperative communication cell 1110 for an MS1 1112, a cooperative communication cell 1120 for an MS2 1122, a cooperative communication cell 1130 for an MS3 1132, and a cooperative communication cell 1140 for an MS4 1142. The cooperative communication cell 1110 includes a serving BS1 1111, an MS1 1112, and a cooperative communication cell member BS2 1113. The cooperative communication cell 1120 includes a serving BS3 1121, an MS2 1122, and the cooperative communication cell member BS2 1113, a cooperative communication cell member BS6 1123, and a cooperative communication cell member BS4 1124. The cooperative communication cell 1130 includes a serving BS5 1131, an MS3 1132, the cooperative communication cell member BS6 1123, and the cooperative communication cell member BS4 1124. The cooperative communication cell 1140 includes a serving BS7 1141, an MS4 1142, and the cooperative communication cell member BS4 1124.

In FIG. 11, the serving BS1 1111 is far from the serving BS7 1141, so the serving BS1 1111 and the serving BS7 1141 can use the same resource c. If the serving BS1 1111 and the serving BS7 1141 use a beam forming scheme, a probability that serving BS1 1111 and the serving BS7 1141 will use the same resource c increases. On the other hand, the serving BS3 1121 and the serving BS5 1131 request the same resource for the cooperative communication cell member BS4 1124 and the cooperative communication cell member BS6 1123.

This means an intention of transmitting a MAC PDU to the MS3 1132 and the MS4 1142 using the same resource, so this can result in a typical resource allocation collision situation. In this case, information indicating that a resource allocation collision situation can occur should be notified to a related serving BS, so the related serving BS should select other resource. That is, serving BSs transmit information on a resource which a related cooperative communication cell member BS will use through a DL_RA-CMD message.

For example, in a case that the serving BS5 1131 notifies to the cooperative communication cell member BS4 1124 and the cooperative communication cell member BS6 1123 that the serving BS5 1131 has allocated the resource d, if the serving BS3 1121 as other serving BS of the cooperative communication cell member BSs allocates the resource d to the cooperative communication cell member BS4 1124 and the cooperative communication cell member BS6, the cooperative communication cell member BS4 1124 and the cooperative communication cell member BS6 transmits information on this resource allocation to the serving BS5 1131 which has a BSID is greater than a BSID of the serving BS3 1121 through a DL_RA-CONFLICT-IND message in Table 6.

TABLE 6

| DL_RA-CONFLICT-IND format( ) { | |
|---|---|
| Message Type = xx | |
| Available Resource list (for loop) | |
| (Optional) Serving BS list (for loop) | The list of Serving BS which allocated the same resource. It excludes Serving BS which properly got possession of the resource. |
| } | |

After receiving the DL_RA-CONFLICT-IND message from the cooperative communication cell member BS4 1124 and the cooperative communication cell member BS6 1123, the serving BS5 1131 can detect which available resources are remaining based on an Available Resource list in the received DL_RA-CONFLICT-IND message. That is, the cooperative communication cell member BS4 1124 will indicate that available resources are a, b, and e (since the serving BS7 1141 uses an available resource c and the serving BS3 1121 uses an available resource d), and the cooperative communication cell member BS6 1123 will indicate that available resources are c, e, and f (since the serving BS3) 1121 uses the available resource d).

If there are more than three serving BSs which request to allocate the same resource, that is, one serving BS is allocated a related resource and other serving BSs are allocated other resource, cooperative communication cell member BSs include a Serving BS list into a DL_RA-CONFLICT-IND message. The Serving BS list includes BSIDs of serving BSs which have requested to allocate the same resource (that is, have transmitted a DL_RA-CMD message), and does not include a BSID of a serving BS with the highest priority which occupies a related resource.

After receiving the DL_RA-CONFLICT-IND message, each of serving BSs selects a resource based on an Available Resource list according to a priority of the serving BSs as described above, so a detailed description will be omitted herein.

In FIG. 11, there are two serving BSs which request the same resource d, so the Serving BS list is not included in the DL_RA-CONFLICT-IND message. So, the serving BS5 1131 detects that the cooperative communication cell member BS4 1124 and the cooperative communication cell member BS6 1123 can use a resource e as an available resource to determine to use the resource e, and transmits a DL_RA-CMD message including information on this to the cooperative communication cell member BS4 1124 and the cooperative communication cell member BS6 1123.

In FIG. 11, a resource allocation collision can occur since the cooperative communication cell member BS4 1124 and the cooperative communication cell member BS6 1123 are connected to the serving BS3 1121 and serving BS5 1131. However, a resource allocation collision can occur at some cooperative communication cell member BSs. So, even though cooperative communication cell member BSs in which a resource allocation collision can occur transmit a DL_RA-CONFLICT-IND message, a serving BS which receives the DL_RA-CONFLICT-IND message needs to notify to all cooperative communication cell member BSs that the serving BS reallocates a resource in order to avoid a resource allocation collision.

So, the serving BS transmits a DL_RA-CMD message to all cooperative communication cell member BSs which are related to a resource allocation operation. In this case, the serving BS detects a common available resource which can be used in a related cooperative communication cell by comparing an available resource which is determined based on DL_RA-CONFLICT-IND messages which cooperative communication cell member BSs transmit with an available resource which is determined based on a DL_RA-RSP message which a cooperative communication cell member BS has transmitted for the cooperative communication cell member BS which does not transmit a DL_RA-CONFLICT-IND message. The serving BS selects the first common available resource (or other available resource), and includes information on the selected common available resource into a DL_RA-CMD message. The aforementioned operation is repeated until no more resource collision situation occurs, that is, until the serving BS receives no more DL_RA-CONFLICT-IND message.

Meanwhile, if a cooperative communication system allocates a resource, a resource allocation collision can occur many times, so a related serving BS can repetitively perform a DL_RA-CONFLICT-IND/DL-RA-CMD message exchange operation as many as resource allocation collision times with related cooperative communication cell member BSs. In this case, time used for allocating a resource can be longer than a length of specific frame on which a scheduling operation has been expected (a frame indicated by Frame_Info). In this case, a related serving BS abandons resource allocation for a related cooperative communication cell member BS, and does not transmit a DL_RA-CMD message any more. If the serving BS recognizes that there are no available resource in a cooperative communication cell member that is, an Available Resource List included in a DL_RA-CONFLICT-IND message does not include information on an available resource), the serving BS performs a resource allocation request operation for other cooperative communication cell member BSs except for the cooperative communication cell member BS or abandons the resource allocation request operation. That is, a serving BS transmits a DL_RA-CMD message (which notifies a resource allocation request or a resource allocation cancellation) to a cooperative communication cell member BS.

That is, in a case that a serving BS processes an arbitrary MAC PDU on a specific frame, if the serving BS retransmits a DL_RA-CMD message in order to re-request to allocate a resource or cancel to allocate a resource for a cooperative communication cell member BS which has transmitted the DL_RA-CMD message at least once, the serving BS should transmit a related DL_RA-CMD message to all cooperative communication cell member BSs within a cooperative communication cell. Here, the serving BS does not need to transmit the DL_RA-CMD message to a cooperative communication cell member BS to which the serving BS has transmitted the DL_RA-CMD message for canceling to allocate the resource or a cooperative communication cell member BS which notifies that there is no available resource through a DL_RA-CONFLICT-IND message.

If the serving BS succeeded in requesting to allocate a resource through the aforementioned operation, the serving BS transmits a MAP message including RA_Info including information on this to an MS.

As described above, a serving BS with a low BSID has a relatively high priority, however, it will be understood by those of ordinary skill in the art that a resource allocation operation can be performed in order that a serving BS with a high BSID has a relatively high priority. That is, a priority for allocating a resource can be adaptively determined based on a system situation of a cooperative communication system, and a detailed description will be omitted herein.

Another example of a resource collision situation which can occur in a case that a plurality of serving BSs allocate the same resource to one cooperative communication cell member BS in a cooperative communication system according to an embodiment of the present disclosure has been described with reference to FIG. 11, and a relationship among frames on a front haul and frames on air I/F in a resource collision situation in FIG. 11 will be described with reference to FIG. 12.

Figure 12:
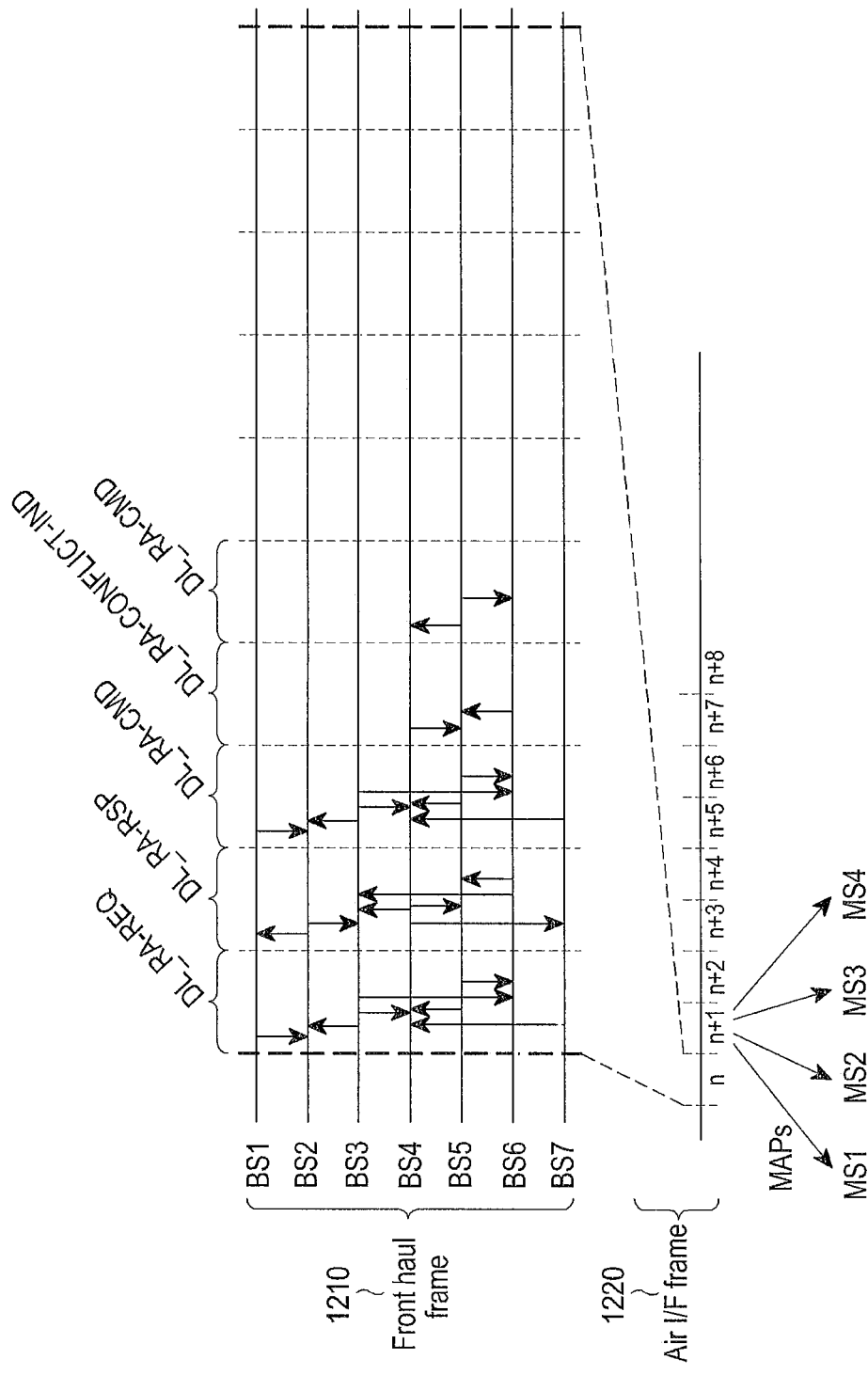
FIG. 12 schematically illustrates a relationship among frames on a front haul and frames on air I/F in a resource collision situation in FIG. 11.

FIG. 12 schematically illustrates a relationship among frames on a front haul and frames on air I/F in a resource collision situation in FIG. 11.

Referring to FIG. 12, in a situation that an arbitrary cooperative communication cell member BS is included in a plurality of cooperative communication cells, if a cooperative communication cell member BS which receives a resource allocation request (scheduling on a specific frame) for an MS from a serving BS responds to the serving BS, the cooperative communication cell member BS notifies a BSID of other serving BS which requests scheduling on the specific frame. So, if the serving BS determines a priority of resource allocation at the cooperative communication cell member BS and a resource allocation collision among serving BSs at the cooperative communication cell member BS occurs, the cooperative communication cell member BS notifies information on a remaining available resource except for resources which the serving BS has allocated to the serving BS thereby avoiding a resource allocation collision.

In FIG. 12, for removing a resource allocation collision, if there is no time for scheduling on a related frame or there is no more available resource at a related cooperative communication cell member BS, a related serving BS stops requesting to allocate a resource for a related cooperative communication cell member BS and includes information on this into a MAP message.

(2) Resource Collision Avoidance Scheduling Embodiment #2

Firstly, in a resource collision avoidance scheduling embodiment #1, if a serving BS requests to allocate a specific resource under a cooperation of a cooperative communication cell member BS, the serving BS determines a priority for a resource use based on a BSID of a related BS. Like this, since the priority is determined based on the BSID of the related BS, an unfair state that a serving BS with a relatively high BSID is excluded from a resource allocation can be continue.

It is preferred that MAC PDUs which occur in each of service flows with different QoSs are processed corresponding to a service flow characteristic. That is, if MAC PDUs including real time traffic which is sensitive to delay such as voice are scheduled, the MAC PDUs should be preferentially processed compared with other MAC PDUs. Based on a resource collision avoidance scheduling embodiment #2, even though a MAC PDU includes real time traffic, the MAC PDU may not be processed on a desired frame due to a low priority of a BSID, so an operation of requesting to allocate a resource for scheduling the MAC PDU can be re-performed after the desired frame. For resolving this problem, if a serving BS transmits a DL_RA-REQ message to cooperative communication cell member BSs within a cooperative communication cell, the serving BS includes a QoS type of an MS along with other parameters into the DL_RA-REQ message.

For example, the QoS type of the MS can be implemented with n (2n=N) bits, and described below.
  <QoS type>
  0: urgent data traffic
  1: real time traffic
  2: non-teal time traffic
  3~N: reserved A relationship among frames on a front haul and frames on air I/F in a resource collision situation in FIG. 11 has been described with reference to FIG. 12, and another example of a resource collision situation which can occur in a case that a plurality of serving BSs allocate the same resource to one cooperative communication cell member BS in a cooperative communication system according to an embodiment of the present disclosure will be described with reference to FIG. 13.

Figure 13:
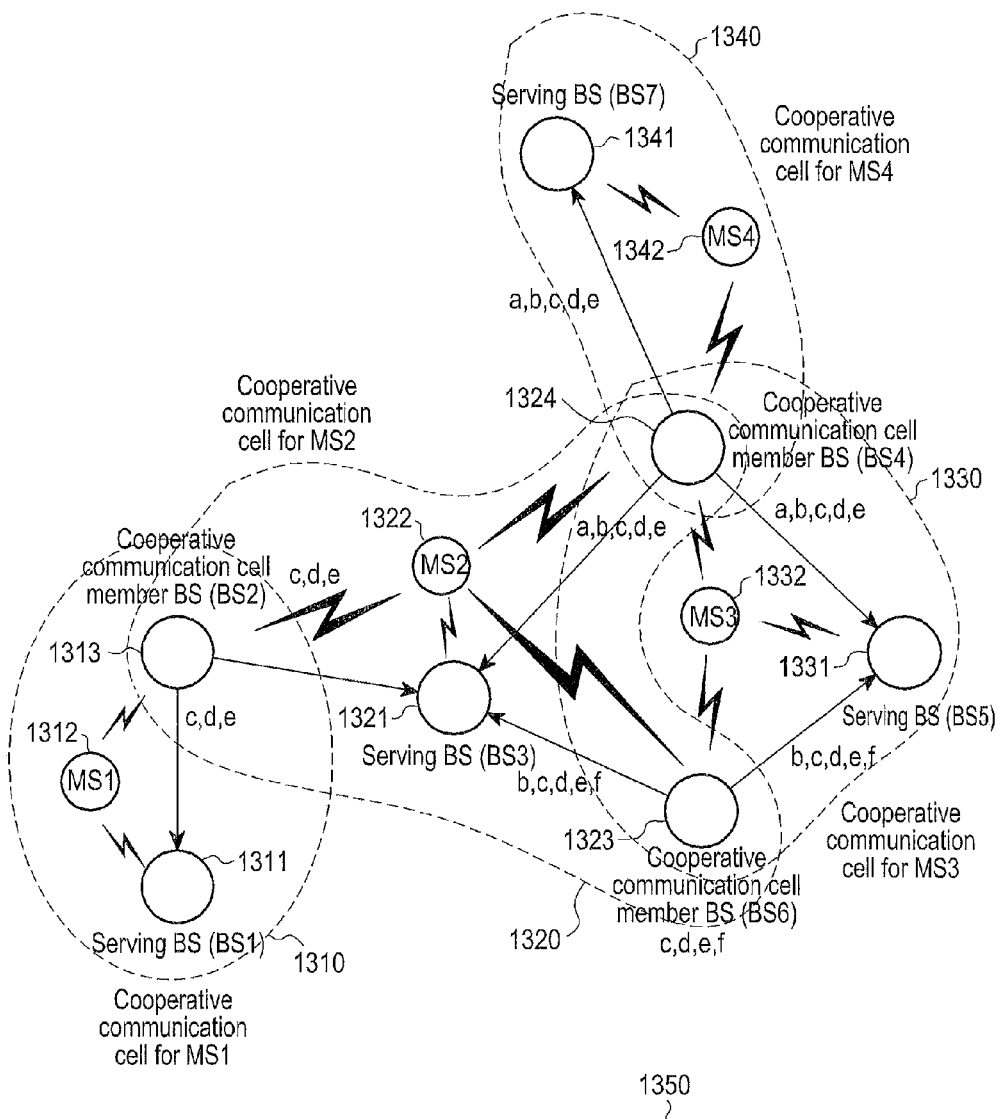
FIG. 13 schematically illustrates another example of a resource collision situation which may occur in a case that a plurality of serving BSs allocate the same resource to one cooperative communication cell member BS in a cooperative communication system according to an embodiment of the present disclosure.

FIG. 13 schematically illustrates another example of a resource collision situation which can occur in a case that a plurality of serving BSs allocate the same resource to one cooperative communication cell member BS in a cooperative communication system according to an embodiment of the present disclosure.

Referring to FIG. 13, the cooperative communication system includes total four cooperative communication cells, i.e., a cooperative communication cell 1310 for an MS1 1312, a cooperative communication cell 1320 for an MS2 1322, a cooperative communication cell 1330 for an MS3 1332, and a cooperative communication cell 1340 for an MS4 1342. The cooperative communication cell 1310 includes a serving BS1 1311, the MS1 1312, and a cooperative communication cell member BS2 1313. The cooperative communication cell 1320 includes a serving BS3 1321, an MS2 1322, and the cooperative communication cell member BS2 1313, a cooperative communication cell member BS6 1323, and a cooperative communication cell member BS4 1324. The cooperative communication cell 1330 includes a serving BS5 1331, an MS3 1332, the cooperative communication cell member BS6 1323, and the cooperative communication cell member BS4 1324. The cooperative communication cell 1340 includes a serving BS7 1341, an MS4 1342, and the cooperative communication cell member BS4 1324.

After simultaneously receiving DL_RA-REQ messages from serving BSs which want to schedule the same frame, a cooperative communication cell member BS includes an available resource list and a (serving BS BSID, MAC PDU QoS Type) pair list into a DL_RA-RSP message to transmit the DL_RA-RSP message to each of the serving BSs in response to the DL_RA-REQ messages. The 'serving BS BSID' included in the (serving BS BSID, MAC PDU QoS Type) pair list denotes a BSID of a serving BS which manages a cooperative communication cell in which a cooperative communication cell member BS included. The 'MAC PDU QoS Type' included in the (serving BS BSID, MAC PDU QoS Type) pair list denotes a QoS Type of a MAC PDU for which a related serving BS requests a resource allocation.

After receiving the DL_RA-RSP message from the cooperative communication cell member BSs, the serving BS detects an available resource which cooperative communication cell member BSs within a cooperative communication cell can commonly use, and implicitly regards that the available resource is allocated according to a QoS type of a MAC PDU, that is, the available resource is allocated firstly is allocated a MAC PDU with a relatively low QoS.

For example, in FIG. 13, serving BS3 receives information in Table 7.

TABLE 7

| cooperative communication cell member BS of serving BS(BS3, QoS Type = 0) | available resource | serving BS |
|---|---|---|
| BS2 | c, d, e | (BS1, QoS Type = 2) |
| BS4 | a, b, c, d, e | (BS5, QoS Type = 1) |
|  |  | (BS7, QoS Type = 2) |
| BS6 | c, d, e, f | (BS5, QoS Type = 1) |

Based on Table 7, if the serving BS3 1321 considers scheduling of cooperative communication cell member BSs (BS2, BS4, and BS6) 1313, 1324, and 1323 through all cooperative communication cell member BSs, the serving BS3 1321 can detect that the available resources c, d, and e are usable. The serving BS3 1321 detects that other serving BSs (BS1, BS5, and BS7) 1311, 1331, and 1341 have performed an available resource request operation for the same cooperative communication cell member BSs (BS2, BS4, and BS6) 1313, 1324, and 1323.

Unlike a resource collision avoidance scheduling embodiment #1, it will be assumed that a resource allocation/use operation is performed based on a QoS type of a MAC PDU.

In this case, the serving BS3 1321 has QoS Type=0 as the highest priority and is allocated the available resource c, and the serving BS5 1331 has QoS Type=1 as the next priority and is allocated the available resource d. The serving BSs (BS1 and BS7) 1311 and 1341 have QoS Type=2, so a priority of the serving BSs (BS1 and BS7) 1311 and 1341 is determined based on a BSID value as in a resource collision avoidance scheduling embodiment #1.

So, it will be assumed that the serving BS3 1321 will be allocated the available resource e and the serving BS7 1341 will be allocated no resource, or the available resource a or the available resource b.

In this way, the serving BSs (BS1, BS5, and BS7) 1311, 1331 and 1341 will be described below.

TABLE 8

| cooperative communication cell member BS of serving BS1, QoS Type = 2) | available resource | serving BS (other than serving BS1)) |
|---|---|---|
| BS2 | c, d, e | (BS3, QoS Type = 0) |

As described in Table 8, the serving BS1 1311 detects that the cooperative communication cell member BS2 1313 can use the available resources c, d, and e. The serving BS1 1311 can detect that other serving BS3 1321 has requested a resource for the cooperative communication cell member BS2 1313. The serving BS3 1321 tries to request a resource for transmitting a MAC PDU with QoS Type=0. Since a priority of the serving BS3 1321 is higher than a priority of the serving BS) 1121, so the serving BS1 1311 assumes that the serving BS3 1321 will use the available resource c and the serving BS1 1311 will use the available resource d.

TABLE 9

| cooperative communication cell member BS of serving BS (BS5, QoS Type = 1) | available resource | serving BS (other than serving BS5) |
|---|---|---|
| BS4 | a, b, c, d, e | (BS3, QoS Type = 0) |
|  |  | (BS7, QoS Type = 2) |
| BS6 | c, d, e, f | (BS3, QoS Type = 0) |

As illustrated in Table 9, the serving BS5 1331 detects that the serving BS5 1331 can use available resources c, d, and e through the cooperative communication cell member BS4 1324 and the cooperative communication cell member BS6 1323. The serving BS5 1331 can detect that other serving BSs (BS3 and BS7) 1321 and 1341 have continuously requested a resource for the cooperative communication cell member BSs (BS4 and BS6) 1324 and 1323. A MAC PDU of the serving BS3 1321 has QoS Type=0, a MAC PDU of the serving BS5 1331 has QoS Type=1, a MAC PDU of the serving BS7 1341 has QoS Type=2, so an order of priorities of serving BSs is the serving BS3 1321, the serving BS5) 1331, and the serving BS7 1341. Hence, the serving BS5 1331 predicts that the serving BS3 1321 is allocated the available resource c, the serving BS5 1331 is allocated the available resource d, and the serving BS7 1341 is allocated the available resource e.

TABLE 10

| cooperative communication cell member BS of serving BS (BS7, QoS Type = 2) | available resource | serving BS (other than serving BS7 |
|---|---|---|
| BS4 | a, b, c, d, e | (BS3, QoS Type = 0) |
|  |  | (BS5, QoS Type = 1) |

In Table 10, the serving BS7 1341 detects that the serving BS7 1341 can use available resources a, b, c, d, and e through the cooperative communication cell member BS4 1324. The serving BS7) 1341 can detect that other serving BSs (BS3 and BS5) 1321 and 1331 have requested a resource for the cooperative communication cell member BS4 1324. The serving BS7 1341 detects that the serving BS3) 1321 with QoS Type=0 can use the available resource a, the serving BS5 1331 with QoS Type=1 can use the available resource b, and the serving BS7 1341 with QoS Type=2 can use the available resource c.

So, each serving BS requests resource allocation to cooperative communication cell member BSs through a DL_RA-CMD message as illustrated in Table 11.

TABLE 11

| serving BS | available resource |
|---|---|
| BS1 | D |
| BS3 | C |
| BS5 | D |
| BS7 | C |

Another example of a resource collision situation which can occur in a case that a plurality of serving BSs allocate the same resource to one cooperative communication cell member BS in a cooperative communication system according to an embodiment of the present disclosure has been described with reference to FIG. 13, and another example of a resource collision situation which can occur in a case that a plurality of serving BSs allocate the same resource to one cooperative communication cell member BS in a cooperative communication system according to an embodiment of the present disclosure will be described with reference to FIG. 14.

Figure 14:
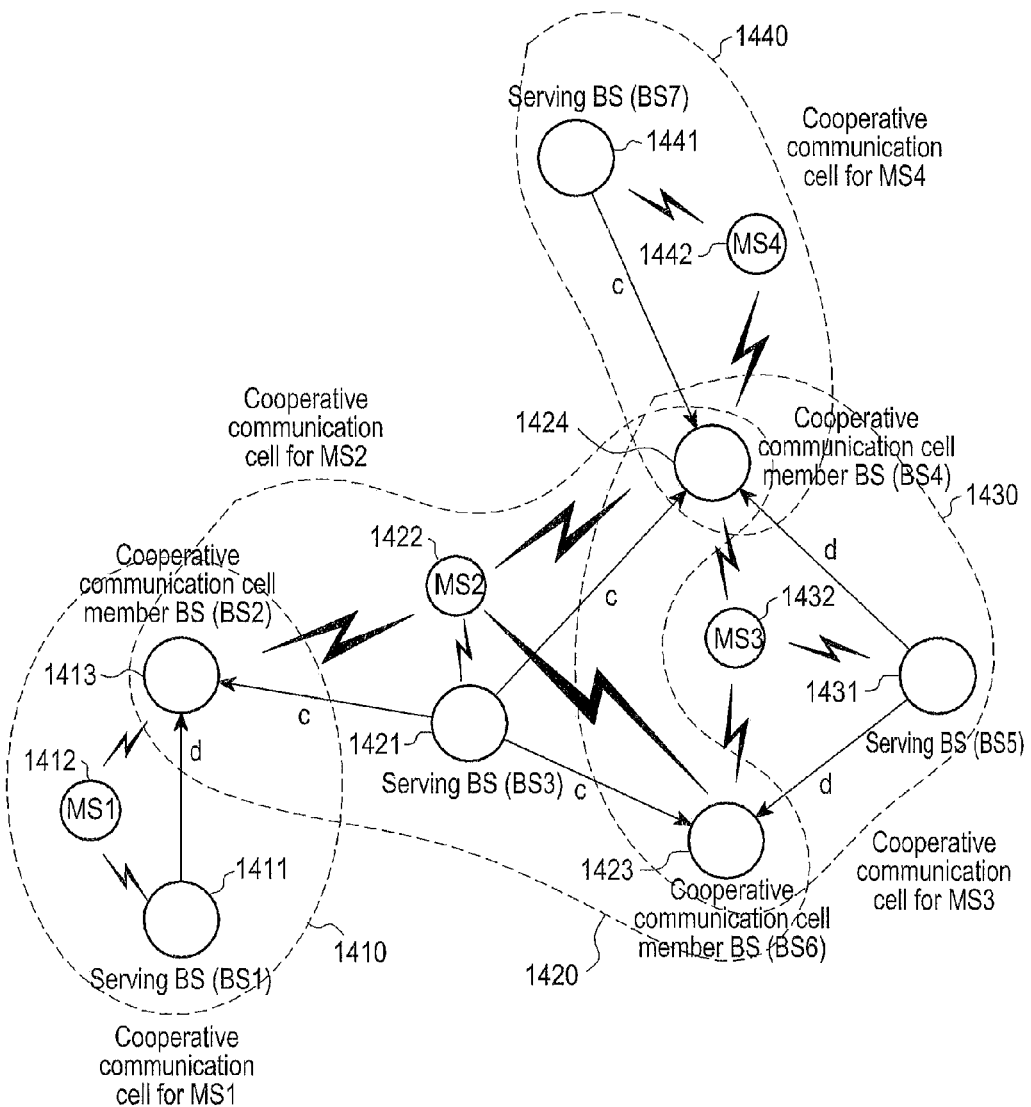
FIG. 14 schematically illustrates another example of a resource collision situation which may occur in a case that a plurality of serving BSs allocate the same resource to one cooperative communication cell member BS in a cooperative communication system according to an embodiment of the present disclosure.

FIG. 14 schematically illustrates another example of a resource collision situation which can occur in a case that a plurality of serving BSs allocate the same resource to one cooperative communication cell member BS in a cooperative communication system according to an embodiment of the present disclosure.

Referring to FIG. 14, the cooperative communication system includes total four cooperative communication cells, i.e., a cooperative communication cell 1410 for an MS1 1412, a cooperative communication cell 1420 for an MS2 1422, a cooperative communication cell 1430 for an MS3 1432, and a cooperative communication cell 1440 for an MS4 1442. The cooperative communication cell 1410 includes a serving BS1 1411, the MS1 1412, and a cooperative communication cell member BS2 1413. The cooperative communication cell 1420 includes a serving BS3 1421, an MS2 1422, and the cooperative communication cell member BS2 1413, a cooperative communication cell member BS6 1423, and a cooperative communication cell member BS4 1424. The cooperative communication cell 1430 includes a serving BS5 1431, an MS3 1432, the cooperative communication cell member BS6 1423, and the cooperative communication cell member BS4 1424. The cooperative communication cell 1440 includes a serving BS7 1441, an MS4 1442, and the cooperative communication cell member BS4 1424.

As illustrated as FIG. 14, the serving BS3 1421 and the serving BS7 1441 request to use the same resource c for the cooperative communication cell member BS4 1424. This is for transmitting MAC PDU to the MS3 1432 and the MS4 1442 using the same resource, so a typical resource allocation collision occurs. In this case, the cooperative communication cell member BS4 1424 notifies a serving BS of information on the resource allocation collision, and the serving BS should select other resource.

That is, in view of a serving BS, serving BSs transmit information on a resource which a related cooperative communication cell member BS will use through a DL_RA-CMD message. In a case that the serving BS notifies the cooperative communication cell member BS4 1424 that the serving BS has selected the resource c, if another serving BS7 1441 of the cooperative communication cell member BSs allocates the resource c to the cooperative communication cell member BS4 1424, the cooperative communication cell member BS4 1424 transmits a DL_RA-CONFLICT-IND message to the serving BS7 1441 of which a priority is lower than a priority of the serving BS3 1421 according to a priority of QoS type. In this case, the Available Resource List includes information on available resources a, b, d, and e. A Serving BS list can be included in the DL_RA-CONFLICT-IND message along with the Available Resource List. In this case, the Serving BS list can be included as a form of (Serving BSID, QoS Type) pair or (Serving BSID), this is possible under an assumption that a serving BS which has a related Serving BSID has already known a QoS type which has been transmitted through a previously received DL_RA-RSP message.

After receiving the DL_RA-CONFLICT-IND message from the cooperative communication cell member BS4 1424, the serving BS7 1441 can detect that which available resources are remaining based on the Available Resource list in the received DL_RA-CONFLICT-IND message. That is, the cooperative communication cell member BS4 1424 determines to use a resource a, and transmits a DL_RA-CMD message including this result to all cooperative communication cell member BSs (i.e., the cooperative communication cell member BS4 1424). The process of processing the resource allocation collision has been described in a resource collision avoidance scheduling embodiment #1 and a description thereof will be omitted herein.

(3) Resource Collision Avoidance Scheduling Embodiment #3

A joint transmission operation which avoids a resource collision based on a QoS type and a BSID has been described above. So, in a resource collision avoidance scheduling embodiment #3, a scheduling which avoids a resource collision based a new additional parameter, i.e., a CINR value will be described below.

Another example of a resource collision situation which can occur in a case that a plurality of serving BSs allocate the same resource to one cooperative communication cell member BS in a cooperative communication system according to an embodiment of the present disclosure has been described with reference to FIG. 14, and another example of a resource collision situation which can occur in a case that a plurality of serving BSs allocate the same resource to one cooperative communication cell member BS in a cooperative communication system according to an embodiment of the present disclosure will be described with reference to FIG. 15.

Figure 15:
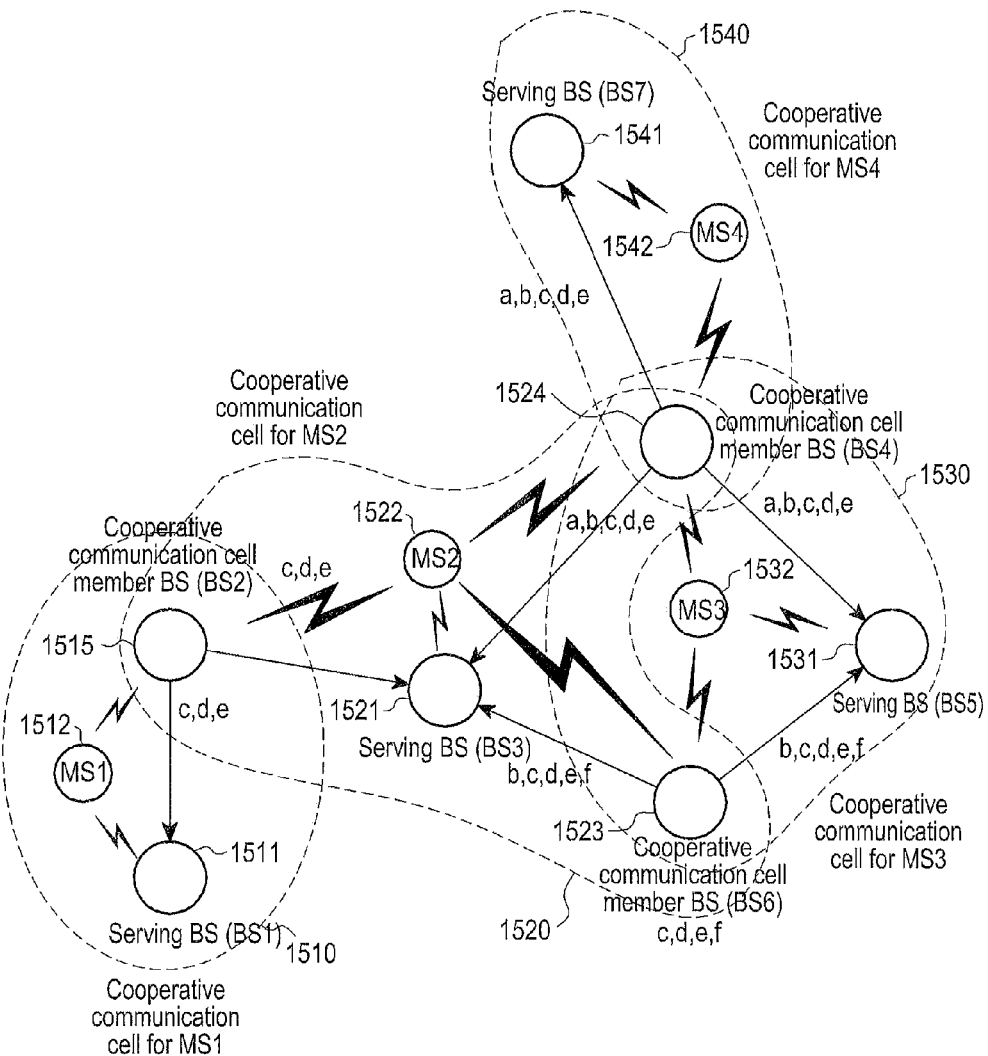
FIG. 15 schematically illustrates another example of a resource collision situation which may occur in a case that a plurality of serving BSs allocate the same resource to one cooperative communication cell member BS in a cooperative communication system according to an embodiment of the present disclosure.

FIG. 15 schematically illustrates another example of a resource collision situation which can occur in a case that a plurality of serving BSs allocate the same resource to one cooperative communication cell member BS in a cooperative communication system according to an embodiment of the present disclosure.

Referring to FIG. 15, the cooperative communication system includes total four cooperative communication cells, i.e., a cooperative communication cell 1510 for an MS1 1512, a cooperative communication cell 1520 for an MS2 1522, a cooperative communication cell 1530 for an MS3 1532, and a cooperative communication cell 1540 for an MS4 1542. The cooperative communication cell 1510 includes a serving BS1 1511, the MS1 1512, and a cooperative communication cell member BS2 1513. The cooperative communication cell 1520 includes a serving BS3 1521, an MS2 1522, and the cooperative communication cell member BS2 1513, a cooperative communication cell member BS6 1523, and a cooperative communication cell member BS4 1524. The cooperative communication cell 1530 includes a serving BS5 1531, an MS3 1532, the cooperative communication cell member BS6 1523, and the cooperative communication cell member BS4 1524. The cooperative communication cell 1540 includes a serving BS7 1541, an MS4 1542, and the cooperative communication cell member BS4 1524.

TABLE 12

| cooperative communication cell member BS of serving BS (BS1, CINR = 6, QoS Type = 2) | available resource | serving BS (other than serving BS1) |
|---|---|---|
| BS2 | c, d, e | (BS3, CINR = 10, QoS Type = 0) |

TABLE 13

| cooperative communication cell member BS of serving BS (BS3, CINR = 10, QoS Type = 0) | available resource | serving BS (other than serving BS1) |
|---|---|---|
| BS2 | c, d, e | (BS1, CINR = 6, QoS Type = 2) |
| BS4 | a, b, c, d, e | (BS5, CINR = 20, QoS Type = 1) (BS7, CINR = 20, QoS Type = 2) |
| BS6 | , c, d, e, f | (BS5, CINR = 20, QoS Type = 1) |

TABLE 14

| cooperative communication cell member BS of serving BS (BS5, CINR = 20, QoS Type = 1) | available resource | serving BS (other than serving BS5) |
|---|---|---|
| BS4 | a, b, c, d, e | (BS3, CINR = 10, QoS Type = 0) (BS7, CINR = 20, QoS Type = 2) |
| BS6 | , c, d, e, f | (BS3, CINR = 10, QoS Type = 0) |

TABLE 15

| cooperative communication cell member BS of serving BS (BS7, CINR = 20, QoS Type = 2) | available resource | serving BS (other than serving BS (BS7)) |
|---|---|---|
| BS4 | a, b, c, d, e | (BS3, CINR = 10, QoS Type = 0) (BS5, CINR = 20, QoS Type = 1) |

So, a result in Table 16 can be derived.

TABLE 16

| serving BS | available resource |
|---|---|
| BS1, CINR = 6, QoS Type = 2 | select d |
| BS3, CINR = 10, QoS Type = 0 | select e |
| BS5, CINR = 20, QoS Type = 1 | select c |
| BS7, CINR = 20, QoS Type = 2 | select b |

Meanwhile, other operations in a resource collision avoidance scheduling embodiment #3 are identical to operations in a resource collision avoidance scheduling embodiment #1 and a resource collision avoidance scheduling embodiment #3, so a detailed description will be omitted herein.

Another example of a resource collision situation which can occur in a case that a plurality of serving BSs allocate the same resource to one cooperative communication cell member BS in a cooperative communication system according to an embodiment of the present disclosure has been described with reference to FIG. 15, and an internal structure of an MS in a cooperative communication system according to an embodiment of the present disclosure will be described with reference to FIG. 16.

Figure 16:
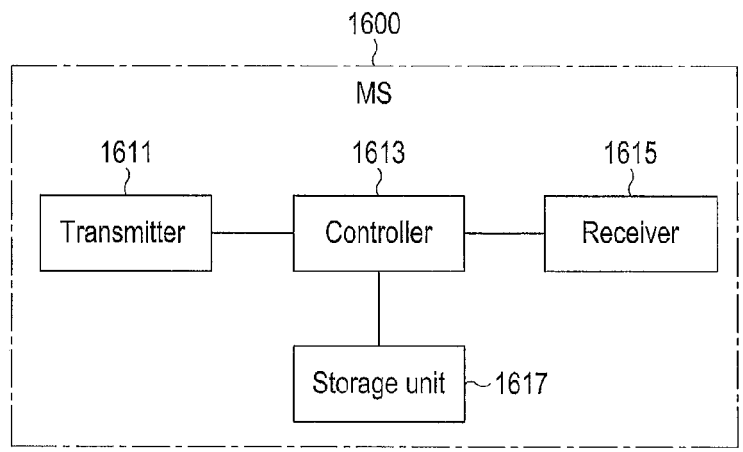
FIG. 16 schematically illustrates an internal structure of an MS in a cooperative communication system according to an embodiment of the present disclosure.

FIG. 16 schematically illustrates an internal structure of an MS in a cooperative communication system according to an embodiment of the present disclosure.

Referring to FIG. 16, an MS 1600 includes a transmitter 1611, a controller 1613, a receiver 1615, and a storage unit 1617.

The controller 1613 controls the overall operation of the MS 1600. In particular, the controller 1613 controls the MS 1600 to perform an operation related to a serving BS change operation, a cooperative communication cell member BS update operation, and a recourse collision avoidance operation as described in FIGS. 1 to 15.

The storage unit 1617 stores a program and data related to the operation of the MS 1600, i.e., the operation related to the serving BS change operation, the cooperative communication cell member BS update operation, and the resource collision avoidance operation as described in FIGS. 1 to 15.

The transmitter 1611 transmits messages to a serving BS and cooperative communication cell member BSs under a control of the controller 1613. The messages transmitted in the transmitter 1611 have been described in FIGS. 1 to 15 and a description thereof will be omitted herein.

The receiver 1615 receives messages from the serving BS and the cooperative communication cell member BSs under a control of the controller 1613. The messages received in the receiver 1615 have been described in FIGS. 1 to 15 and a description thereof will be omitted herein.

While the transmitter 1611, the controller 1613, the receiver 1615, and the storage unit 1617 are shown in FIG. 16 as separate units, it is to be understood that this is for merely convenience of description. In other words, two or more of the transmitter 1611, the controller 1613, the receiver 1615, and the storage unit 1617 can be incorporated into a single unit.

An internal structure of an MS in a cooperative communication system according to an embodiment of the present disclosure has been described with reference to FIG. 16, and an internal structure of a serving BS in a cooperative communication system according to an embodiment of the present disclosure will be described with reference to FIG. 17.

Figure 17:
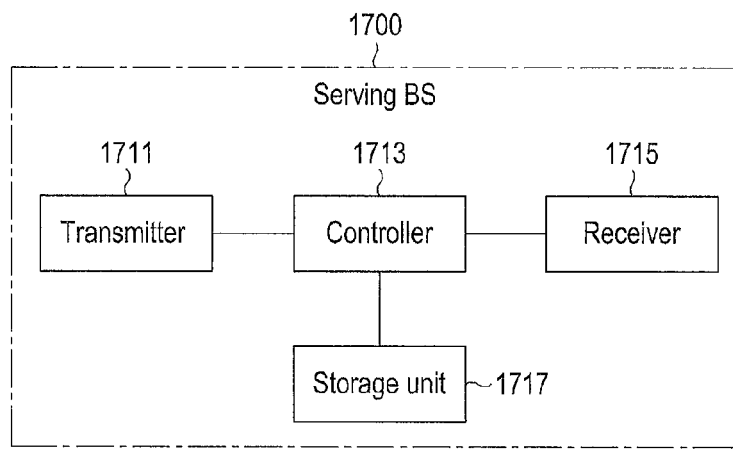
FIG. 17 schematically illustrates an internal structure of a serving BS in a cooperative communication system according to an embodiment of the present disclosure.

FIG. 17 schematically illustrates an internal structure of a serving BS in a cooperative communication system according to an embodiment of the present disclosure.

Referring to FIG. 17, a serving BS 1700 includes a transmitter 1711, a controller 1713, a receiver 1715, and a storage unit 1717.

The controller 1713 controls the overall operation of the serving BS 1700. In particular, the controller 1713 controls the serving BS 1700 to perform an operation related to a serving BS change operation, a cooperative communication cell member BS update operation, and a resource collision avoidance operation as described in FIGS. 1 to 15.

The storage unit 1717 stores a program and data related to the operation of the serving BS 1700, i.e., the operation related to the serving BS change operation, the cooperative communication cell member BS update operation, and the resource collision avoidance operation as described in FIGS. 1 to 15.

The transmitter 1711 transmits messages to an MS and cooperative communication cell member BSs under a control of the controller 1713. The messages transmitted in the transmitter 1711 have been described in FIGS. 1 to 15 and a description thereof will be omitted herein.

The receiver 1715 receives messages from the MS and the cooperative communication cell member BSs under a control of the controller 1713. The messages received in the receiver 1715 have been described in FIGS. 1 to 15 and a description thereof will be omitted herein.

While the transmitter 1711, the controller 1713, the receiver 1715, and the storage unit 1717 are shown in FIG. 17 as separate units, it is to be understood that this is for merely convenience of description. In other words, two or more of the transmitter 1711, the controller 1713, the receiver 1715, and the storage unit 1717 can be incorporated into a single unit.

An internal structure of a serving BS in a cooperative communication system according to an embodiment of the present disclosure has been described with reference to FIG. 17, and an internal structure of a cooperative communication cell member BS in a cooperative communication system according to an embodiment of the present disclosure will be described with reference to FIG. 18.

Figure 18:
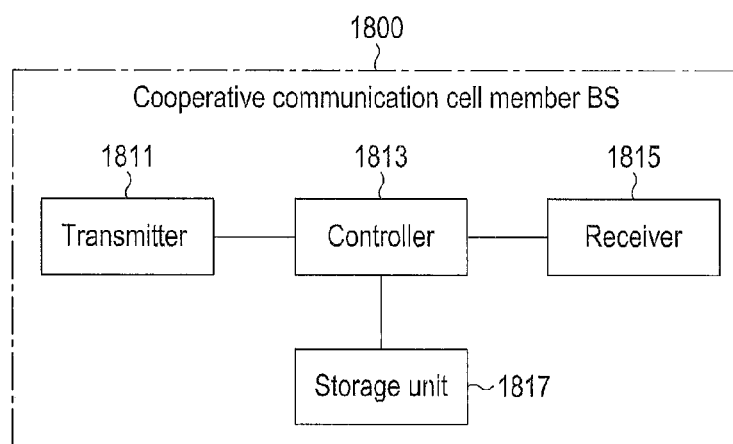
FIG. 18 schematically illustrates an internal structure of a cooperative communication cell member BS in a cooperative communication system according to an embodiment of the present disclosure.

FIG. 18 schematically illustrates an internal structure of a cooperative communication cell member BS in a cooperative communication system according to an embodiment of the present disclosure.

Referring to FIG. 18, a cooperative communication cell member BS 1800 includes a transmitter 1811, a controller 1813, a receiver 1815, and a storage unit 1817.

The controller 1813 controls the overall operation of the cooperative communication cell member BS 1800. In particular, the controller 1813 controls the cooperative communication cell member BS 1800 to perform an operation related to a serving BS change operation, a cooperative communication cell member BS update operation, and a resource collision avoidance operation as described in FIGS. 1 to 15.

The storage unit 1817 stores a program and data related to the operation of the cooperative communication cell member BS 1800, i.e., the operation related to the serving BS change operation, the cooperative communication cell member BS update operation, and the resource collision avoidance operation as described in FIGS. 1 to 15.

The transmitter 1811 transmits messages to an MS and a serving BS under a control of the controller 1813. The messages transmitted in the transmitter 1811 have been described in FIGS. 1 to 15 and a description thereof will be omitted herein.

The receiver 1815 receives messages from the MS and the serving BS under a control of the controller 1813. The messages received in the receiver 1815 have been described in FIGS. 1 to 15 and a description thereof will be omitted herein.

While the transmitter 1811, the controller 1813, the receiver 1815, and the storage unit 1817 are shown in FIG. 18 as separate units, it is to be understood that this is for merely convenience of description. In other words, two or more of the transmitter 1811, the controller 1813, the receiver 1815, and the storage unit 1817 can be incorporated into a single unit.

As is apparent from the foregoing description, an embodiment of the present disclosure enables to effectively allocate a resource in a cooperative communication system.

An embodiment of the present disclosure enables to effectively schedule data in a cooperative communication system.

An embodiment of the present disclosure enables to effectively schedule data according to a change of a serving BS for an MS in a cooperative communication system.

An embodiment of the present disclosure enables to effectively schedule data using an inter-BS scheduling scheme according to a change of a serving BS for an MS in a cooperative communication system.

As is apparent from the foregoing description, an embodiment of the present disclosure enables a serving BS to prevent forwarding data which is buffered in an old serving BS before a serving BS is changed to all cooperative communication cell member BSs within a cooperative communication cell in a cooperative communication system. So, the present disclosure enables to prevent latency increase and repetitive data forwarding which is unnecessarily performed through a front haul link among BSs.

Certain aspects of the present disclosure can also be embodied as computer readable code on a computer readable recording medium. A computer readable recording medium is any data storage device that can store data, which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

It can be appreciated that a method and apparatus according to an embodiment of the present disclosure can be implemented by hardware, software and/or a combination thereof. The software can be stored in a non-volatile storage, for example, an erasable or re-writable read only memory (ROM), a memory, for example, a random access memory (RAM, a memory chip, a memory device, or a memory integrated circuit (IC), or an optically or magnetically recordable non-transitory machine-readable, e.g., computer-readable, storage medium, e.g., a compact disk (CD), a digital versatile disk (DVD), a magnetic disk, or a magnetic tape. A method and apparatus according to an embodiment of the present disclosure may be implemented by a computer or a mobile terminal that includes a controller and a memory, and the memory may be an example of a non-transitory machine-readable, e.g., computer-readable, storage medium suitable to store a program or programs including instructions for implementing various embodiments of the present disclosure.

The present disclosure may include a program including code for implementing the apparatus and method as defined by the appended claims, and a non-transitory machine-readable, e.g., computer-readable, storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a contents protect method which has been already installed, information necessary for the contents protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for allocating a resource in a serving base station (BS) in a cooperative communication system, the method comprising:
   detecting a base station identifier (BSID) of the serving BS and a BSID of each of other serving BSs included in the cooperative communication system;
   determining an available resource which the serving BS will use and an available resource which each of other serving BSs will use, based on the BSID of the serving BS and the BSID of each of the other serving BSs; and
   transmitting information on the determined available resources to cooperative communication cell member BSs which the serving BS manages.

2. The method of claim 1, wherein the determining the available resource which the serving BS will use and the available resource which each of the other serving BSs will use based on the BSID of the serving BS and the BSID of each of the other serving BSs comprises:
   determining a priority of each of the serving BS and the other serving BSs for available resources based on a value of the BSID of the serving BS and the BSID of each of the other serving BSs.

3. The method of claim 1, wherein the determining the available resource which the serving BS will use and the available resource which each of the other serving BSs will use based on the BSID of the serving BS and the BSID of each of the other serving BSs comprises:
   allocating a highest priority to a serving BS in a highest order of BSIDs among the BSID of the serving BS and the BSID of each of the other serving BSs to determine the available resource which the serving BS will use and the available resource which each of other serving BSs will use.

4. A method for receiving resource allocation information in a cooperative communication cell member base station (BS) in a cooperative communication system, the method comprising:
   receiving information on available resources which are determined by a serving BS,
   wherein the available resources are determined based on a base station identifier (BSID) of the serving BS and a BSID of each of other serving BSs included in the cooperative communication system.

5. The method of claim 4, wherein the available resources are determined in the serving BS by allocating a highest priority to a serving BS in a highest order of BSIDs among the BSID of the serving BS and the BSID of each of the other serving BSs.

6. A method for allocating a resource in a serving base station (BS) in a cooperative communication system, the method comprising:
   detecting a service flow characteristic of the serving BS and a service flow characteristic of each of other serving BSs included in the cooperative communication system;
   determining an available resource which the serving BS will use and an available resource which each of other serving BSs will use based on the service flow characteristic of the serving BS and the service flow characteristic of each of the other serving BSs; and
   transmitting information on the determined available resources to cooperative communication cell member BSs which the serving BS manages.

7. The method of claim 6, wherein the service flow characteristic includes at least one of a quality of service (QoS) type of a medium access control service data unit (MAC SDU) which is transmitted through a related service flow and a base station identifier (BSID).

8. The method of claim 7, wherein the determining the available resource which the serving BS will use and the available resource which each of the other serving BSs will use based on the service flow characteristic of the serving BS and the service flow characteristic of each of the other serving BSs comprises:
   determining a priority of each of the serving BS and the other serving BSs based on a priority of the QoS type and a value of the BSID if the service flow characteristic includes the QoS type and the BSID.

9. The method of claim 7, wherein the determining the available resource which the serving BS will use and the available resource which each of the other serving BSs will use based on the service flow characteristic of the serving BS and the service flow characteristic of each of the other serving BSs comprises:
   determining a priority of each of the serving BS and the other serving BSs by allocating a highest priority to a serving BS of which a priority of the QoS type is the highest and a value of the BSID is maximum if the service flow characteristic includes the QoS type and the BSID.

10. The method of claim 6, wherein the service flow characteristic includes at least one of a quality of service (QoS) type of a medium access control service data unit (MAC SDU) which is transmitted through a related service flow, a base station identifier (BSID), and a carrier and interference to noise ratio (CINR).

11. The method of claim 10, wherein the determining the available resource which the serving BS will use and the available resource which each of the other serving BSs will use based on the service flow characteristic of the serving BS and the service flow characteristic of each of the other serving BSs comprises:
   determining a priority of each of the serving BS and the other serving BSs based on a priority of the QoS type, a value of the BSID, and the CINR if the service flow characteristic includes the QoS type, the BSID, and the CINR.

12. The method of claim 10, wherein the determining the available resource which the serving BS will use and the available resource which each of the other serving BSs will use based on the service flow characteristic of the serving BS and the service flow characteristic of each of the other serving BSs comprises:
   determining a priority of each of the serving BS and the other serving BSs by allocating a highest priority to a serving BS of which a priority of the QoS type is the highest, a value of the BSID is maximum, and the CINR is maximum if the service flow characteristic includes the QoS type, the BSID, and the CINR.

13. A method for receiving resource allocation information in a cooperative communication cell member base station (BS) in a cooperative communication system, the method comprising:
   receiving information on available resources which are determined by a serving BS,
   wherein the available resources are determined based on a service flow characteristic of the serving BS and a service flow characteristic of each of other serving BSs included in the cooperative communication system.

14. The method of claim 13, wherein the service flow characteristic includes at least one of a quality of service (QoS) type of a medium access control service data unit (MAC SDU) which is transmitted through a related service flow and a base station identifier (BSID).

15. The method of claim 14, wherein a priority of each of the serving BS and the other serving BSs is determined based on a priority of the QoS type and a value of the BSID if the service flow characteristic includes the QoS type and the BSID.

16. The method of claim 14, wherein a priority of each of the serving BS and the other serving BSs is determined in the serving BS by allocating a highest priority to a serving BS of which a priority of the QoS type is the highest and a value of the BSID is maximum if the service flow characteristic includes the QoS type and the BSID.

17. The method of claim 13, wherein the service flow characteristic includes at least one of a quality of service (QoS) type of a medium access control service data unit (MAC SDU) which is transmitted through a related service flow, a base station identifier (BSID), and a carrier and interference to noise ratio (CINR).

18. The method of claim 17, wherein a priority of each of the serving BS and the other serving BSs is determined based on a priority of the QoS type, a value of the BSID, and the CINR if the service flow characteristic includes the QoS type, the BSID, and the CINR.

19. The method of claim 17, wherein a priority of each of the serving BS and the other serving BSs is determined in the serving BS by allocating a highest priority to a serving BS of which a priority of the QoS type is the highest, a value of the BSID is maximum, and the CINR is maximum if the service flow characteristic includes the QoS type, the BSID, and the CINR.

20. A serving base station (BS) in a cooperative communication system, the serving BS comprising:
   a controller configured to detect a base station identifier (BSID) of the serving BS and a BSID of each of other serving BSs included in the cooperative communication system, and determine an available resource which the serving BS will use and an available resource which each of other serving BSs will use based on the BSID of the serving BS and the BSID of each of the other serving BSs; and
   a transmitter configured to transmit information on the determined available resources to cooperative communication cell member BSs which the serving BS manages.

21. The serving BS of claim 20, wherein the controller is configured to determine the available resource which the serving BS will use and the available resource which each of the other serving BSs will use based on the BSID of the serving BS and the BSID of each of the other serving BSs by determining a priority of each of the serving BS and the other serving BSs based on a value of the BSID of the serving BS and the BSID of each of the other serving BSs.

22. The serving BS of claim 20, wherein the controller is configured to determine the available resource which the serving BS will use and the available resource which each of the other serving BSs will use based on the BSID of the serving BS and the BSID of each of the other serving BSs by allocating a highest priority to a serving BS in a highest order of BSIDs among the BSID of the serving BS and the BSID of each of the other serving BSs to determine the available resource which the serving BS will use and the available resource which each of other serving BSs will use.

23. A cooperative communication cell member base station (BS) in a cooperative communication system, the cooperative communication cell member BS comprising:
 a receiver configured to receive information on available resources which are determined by a serving BS,
 wherein the available resources are determined based on a base station identifier (BSID) of the serving BS and a BSID of each of other serving BSs included in the cooperative communication system.

24. The cooperative communication cell member BS of claim 23, wherein the available resources are determined in the serving BS by allocating a highest priority to a serving BS in a highest order of BSIDs among the BSID of the serving BS and the BSID of each of the other serving BSs.

25. A serving base station (BS) in a cooperative communication system, the serving BS comprising:
 a controller configured to detect a service flow characteristic of the serving BS and a service flow characteristic of each of other serving BSs included in the cooperative communication system, and determine an available resource which the serving BS will use and an available resource which each of other serving BSs will use based on the service flow characteristic of the serving BS and the service flow characteristic of each of the other serving BSs; and
 a transmitter configured to transmit information on the determined available resources to cooperative communication cell member BSs which the serving BS manages.

26. The serving BS of claim 25, wherein the service flow characteristic includes at least one of a quality of service (QoS) type of a medium access control service data unit (MAC SDU) which is transmitted through a related service flow and a base station identifier (BSID).

27. The serving BS of claim 26, wherein the controller is configured to determine the available resource which the serving BS will use and the available resource which each of the other serving BSs will use based on the service flow characteristic of the serving BS and the service flow characteristic of each of the other serving BSs by determining a priority of each of the serving BS and the other serving BSs based on a priority of the QoS type and a value of the BSID if the service flow characteristic includes the QoS type and the BSID.

28. The serving BS of claim 26, wherein the controller is configured to determine the available resource which the serving BS will use and the available resource which each of the other serving BSs will use based on the service flow characteristic of the serving BS and the service flow characteristic of each of the other serving BSs by determining a priority of each of the serving BS and the other serving BSs by allocating a highest priority to a serving BS of which a priority of the QoS type is the highest and a value of the BSID is maximum if the service flow characteristic includes the QoS type and the BSID.

29. The serving BS of claim 25, wherein the service flow characteristic includes at least one of a quality of service (QoS) type of a medium access control service data unit (MAC SDU) which is transmitted through a related service flow, a base station identifier (BSID), and a carrier and interference to noise ratio (CINR).

30. The serving BS of claim 29, wherein the controller is configured to determine the available resource which the serving BS will use and the available resource which each of the other serving BSs will use based on the service flow characteristic of the serving BS and the service flow characteristic of each of the other serving BSs by determining a priority of each of the serving BS and the other serving BSs based on a priority of the QoS type, a value of the BSID, and the CINR if the service flow characteristic includes the QoS type, the BSID, and the CINR.

31. The serving BS of claim 29, wherein the controller is configured to determine the available resource which the serving BS will use and the available resource which each of other serving BSs will use based on the service flow characteristic of the serving BS and the service flow characteristic of each of the other serving BSs by determining a priority of each of the serving BS and the other serving BSs by allocating a highest priority to a serving BS of which a priority of the QoS type is the highest, a value of the BSID is maximum, and the CINR is maximum if the service flow characteristic includes the QoS type, the BSID, and the CINR.

32. A cooperative base station (BS) being a communication cell member in a cooperative communication system, the cooperative communication cell member BS comprising:
 a receiver configured to receive information on available resources which are determined by a serving BS,
 wherein the available resources are determined based on a service flow characteristic of the serving BS and a service flow characteristic of each of other serving BSs included in the cooperative communication system.

33. The cooperative BS of claim 32, wherein the service flow characteristic includes at least one of a quality of service (QoS) type of a medium access control service data unit (MAC SDU) which is transmitted through a related service flow and a base station identifier (BSID).

34. The cooperative BS of claim 33, wherein a priority of each of the serving BS and the other serving BSs is determined based on a priority of the QoS type and a value of the BSID if the service flow characteristic includes the QoS type and the BSID.

35. The cooperative BS of claim 33, wherein a priority of each of the serving BS and the other serving BSs is determined in the serving BS by allocating a highest priority to a serving BS of which a priority of the QoS type is the highest and a value of the BSID is maximum if the service flow characteristic includes the QoS type and the BSID.

36. The cooperative BS of claim 32, wherein the service flow characteristic includes at least one of a quality of service (QoS) type of a medium access control service data unit (MAC SDU) which is transmitted through a related service flow, a base station identifier (BSID), and a carrier and interference to noise ratio (CINR).

37. The cooperative BS of claim 36, wherein a priority of each of the serving BS and the other serving BSs is determined based on a priority of the QoS type, a value of the BSID, and the CINR if the service flow characteristic includes the QoS type, the BSID, and the CINR.

38. The cooperative BS of claim 36, wherein a priority of each of the serving BS and the other serving BSs is determined in the serving BS by allocating a highest priority to a serving BS of which a priority of the QoS type is the highest, a value of the BSID is maximum, and the CINR is maximum if the service flow characteristic includes the QoS type, the BSID, and the CINR.

* * * * *